(12) United States Patent
Ceder et al.

(10) Patent No.: US 10,446,872 B2
(45) Date of Patent: Oct. 15, 2019

(54) SOLID ELECTROLYTE AND LITHIUM BATTERY INCLUDING THE SAME

(71) Applicants: Samsung Electronics Co., Ltd., Suwon-si, Gyeonggi-do (KR); MASSACHUSETTS INSTITUTE OF TECHNOLOGY, Cambridge, MA (US)

(72) Inventors: Gerbrand Ceder, Cambridge, MA (US); Jaechul Kim, Cambridge, MA (US); Lincoln Miara, Mountain View, CA (US); William Richards, Cambridge, MA (US); Tomoyuki Tsujimura, Yokohama (JP); Yan Wang, Cambridge, MA (US); Naoki Suzuki, Yokohama (JP)

(73) Assignees: SAMSUNG ELECTRONICS CO., LTD., Gyeonggi-Do (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 377 days.

(21) Appl. No.: 15/226,179

(22) Filed: Aug. 2, 2016

(65) Prior Publication Data
US 2017/0040637 A1 Feb. 9, 2017

Related U.S. Application Data

(60) Provisional application No. 62/201,007, filed on Aug. 4, 2015.

(51) Int. Cl.
H01M 10/0562 (2010.01)
H01M 10/0525 (2010.01)
(Continued)

(52) U.S. Cl.
CPC ......... *H01M 10/0562* (2013.01); *C01B 17/22* (2013.01); *C01B 25/14* (2013.01);
(Continued)

(58) Field of Classification Search
None
See application file for complete search history.

(56) References Cited

U.S. PATENT DOCUMENTS 6,277,524 B1 8/2001 Kanno
8,557,445 B2 10/2013 Tsuchida et al.
(Continued)

FOREIGN PATENT DOCUMENTS

CN 101013753 A 8/2007
CN 100502111 C 6/2009
(Continued)

OTHER PUBLICATIONS

Liu, Zengcai et al. "Anomalous High Ionic Conductivity of Nanoporous B-Li3ps4". Journal of the American Chemical Society, vol. 135, No. 3, 2013, pp. 975-978. (Year: 2013).*
(Continued)

*Primary Examiner* — Robert S Carrico
(74) *Attorney, Agent, or Firm* — Cantor Colburn LLP

(57) ABSTRACT

A solid electrolyte material represented by Formula 1:

$$L_{1+2x}(M1)_{1-x}(M2)(M3)_4 \qquad \text{Formula 1}$$

wherein $0.25<x<1$, L is at least one element selected from a Group 1 element, M1 is at least one element selected from a Group 2 element, a Group 3 element, a Group 12 element, and a Group 13 element, M2 is at least one element selected from a Group 5 element, a Group 14 element, and a Group 15 element, and M3 is at least one element selected from a Group 16 element, and wherein the solid electrolyte material has an I-4 crystal structure.

24 Claims, 25 Drawing Sheets

(51) Int. Cl.
*C01B 25/14* (2006.01)
*C01B 17/22* (2006.01)

(52) U.S. Cl.
CPC .... *H01M 10/0525* (2013.01); *H01M 2220/20* (2013.01); *H01M 2300/0065* (2013.01)

(56) References Cited

U.S. PATENT DOCUMENTS

| | | | |
|---|---|---|---|
| 8,697,292 | B2 | 4/2014 | Kannno et al. |
| 9,142,861 | B2 | 9/2015 | Homma et al. |
| 2013/0040208 | A1* | 2/2013 | Kanno ............... C01B 17/20 429/319 |
| 2014/0272602 | A1 | 9/2014 | Handa et al. |
| 2015/0017548 | A1 | 1/2015 | Kato et al. |

FOREIGN PATENT DOCUMENTS

| | | |
|---|---|---|
| CN | 103401018 A | 11/2013 |
| CN | 103390769 A | 6/2015 |
| JP | 11-176236 A | 7/1999 |
| JP | 5158008 B2 | 12/2012 |
| JP | 2013-033659 A | 2/2013 |
| JP | 2013-037897 A | 2/2013 |
| JP | 5772961 B2 | 7/2015 |
| KR | 1020120136372 A | 12/2012 |
| KR | 1020140116158 A | 10/2014 |
| WO | 2013/024537 A1 | 2/2013 |

OTHER PUBLICATIONS

Jorgens, Stefan et al. "Motive Dichtester Kugelpackungen: Die Verbindungen Zn3(PS4)2 Und LiZnPS4". Zeitschrift Fur Anorganische Und Allgemeine Chemie, vol. 628, No. 8, 2002, pp. 1765-1769. (Year: 2002).*
Richards, William D. et al. "Design of Li1+2Xzn1-Xps4, A New Lithium Ion Conductor". Energy & Environmental Science, vol. 9, No. 10, 2016, pp. 3272-3278. (Year: 2016).*
Wang, Yan et al. "Design Principles for Solid-State Lithium Superionic Conductors". Nature Materials, vol. 14, No. 10, 2015, pp. 1026-1031. (Year: 2015).*
Jorgens et al., "Motifs of Closest Packings: The Compounds Zn3(PS4)2 and LIZnPS4", Z. Anorg. Allg. Chem, 528, 2002, 1765-1769.
Muramatsu et al., "Structural change of Li2S-P255 sulfide solid electrolytes in the atmosphere", Solid State Ionic, 182, 2011, 116-119.
Tomei et al., "Preparation of Amorphous Materials in the system Lil-Li2S-P2S5 by Mechanical Milling and Their Lithium Ion Conducting Properties", The 29th Symposium on Solid State Ionics in Japan, 2003, 26-27.
Wang et al., "Design principles for solid-state lithium superionic conductors", Nature Materials, 2015, 1-7.

* cited by examiner $Li_{10}GeP_2S_{12}$(bcc)

TOP VIEW $Li_7P_3S_{11}$(bcc)

$Li_4GeS_4$(hcp)

TOP VIEW

SIDE VIEW $Li_2S$(fcc)

SIDE VIEW

SOLID ELECTROLYTE AND LITHIUM BATTERY INCLUDING THE SAME

CROSS-REFERENCE TO RELATED APPLICATION

This application claims priority to and the benefit of U.S. Provisional Patent Application No. 62/201,007, filed on Aug. 4, 2015, the content of which is incorporated herein in its entirety by reference.

BACKGROUND

1. Field

The present disclosure relates a solid electrolyte, a lithium battery including the same, and a method of preparing the solid electrolyte.

2. Description of the Related Art

Lithium batteries having high voltage and high energy density are used to power a variety of electronic devices, for example, electric vehicles (e.g., a hybrid electric vehicle (HEV) and a plug-in hybrid electric vehicle (PHEV)). To enable battery operation at high temperatures, the ability of the battery to charge or discharge a large amount of electricity and operate over a long period of battery use, is desirable.

In a lithium battery including a liquid electrolyte, e.g. an electrolyte prepared by dissolving a lithium salt in an organic solvent, the lithium battery may be chemically unstable when an electrode that enables high voltages of 5 V or more is used. In addition, the liquid electrolyte may start to decompose at a voltage of 2.5 V or more, and may have a risk of leakage, fire, and explosion. Further, the liquid electrolyte can cause the formation of dendrites, which can lead to self-discharging and heating of the lithium battery.

In this regard, a battery having higher stability than a lithium battery including a liquid electrolyte may be an all-solid-state lithium battery including a lithium ion conductor as a solid electrolyte. The lithium ion conductor constituting the solid electrolyte is a single ion conductor in which only Li ions are migrated, and thus the lithium battery including the solid electrolyte has only minimal risk of ignition as compared to a lithium battery including a liquid electrolyte. Therefore, it is desireable to develop all-solid-state lithium battery suitable for use in electric vehicles, large-scale storage batteries, and the like.

SUMMARY

Provided is a solid electrolyte having both high Li ion conductivity and excellent chemical stability.

Additional aspects will be set forth in part in the description which follows and, in part, will be apparent from the description, or may be learned by practice of the presented embodiments.

According to an aspect of an embodiment, a solid electrolyte material is represented by Formula 1:

$$L_{1+2x}(M1)_{1-x}(M2)(M3)_4 \quad \text{Formula 1}$$

wherein $0.25 < x < 1$,
L is at least one element selected from a Group 1 element,
M1 is at least one element selected from a Group 2 element, a Group 3 element, a Group 12 element, and a Group 13 element,
M2 is at least one element selected from a Group 5 element, a Group 14 element, and a Group 15 element,
M3 is at least one element selected from a Group 16 element, and wherein the solid electrolyte material has an I-4 crystal structure.

According to an aspect of another embodiment, a method of preparing a solid electrolyte includes:
mixing a compound represented by Formula 3 and amorphous $Li_3PS_4$ to obtain a mixture; and
performing a heat treatment on the resulting mixture:

$$L(M1)(M2)(M3)_4, \quad \text{Formula 3}$$

wherein L is at least one element selected from a Group 1 element,
M1 is at least one element selected from a Group 2 element, a Group 3 element, a Group 12 element, and a Group 13 element,
M2 is at least one element selected from a Group 5 element, a Group 14 element, and a Group 15 element, and
M3 is at least one element selected from a Group 16 element.

According to an aspect of another embodiment, a secondary battery includes:
a positive electrode comprising a positive active material;
a negative electrode comprising a negative active material; and
a solid electrolyte layer comprising the solid electrolyte material represented by Formula 1.

BRIEF DESCRIPTION OF THE DRAWINGS

These and/or other aspects will become apparent and more readily appreciated from the following description of the embodiments, taken in conjunction with the accompanying drawings in which.

Figure 8:
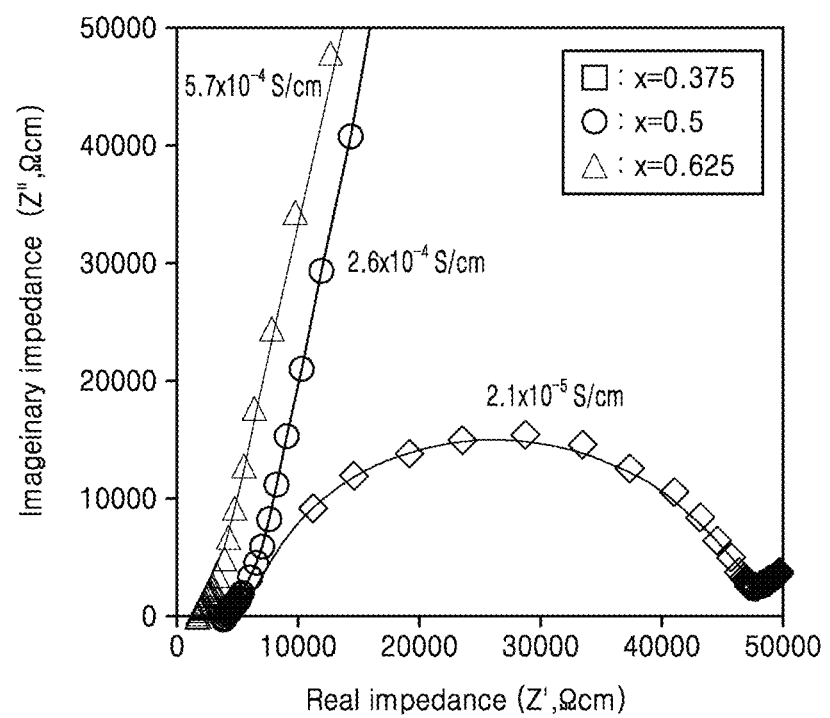
Figure 9:
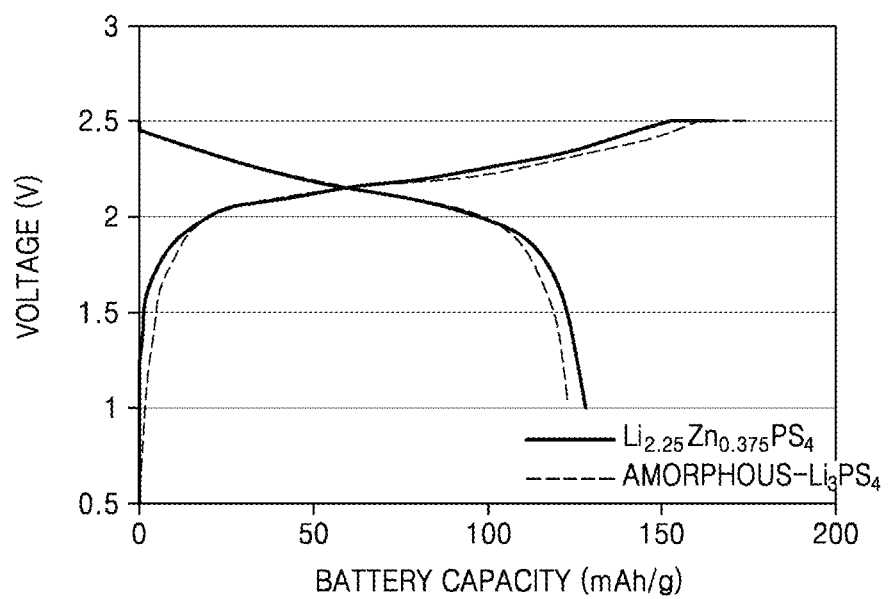
Figure 11A:
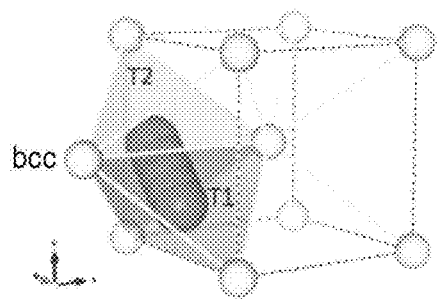
Figure 11D:
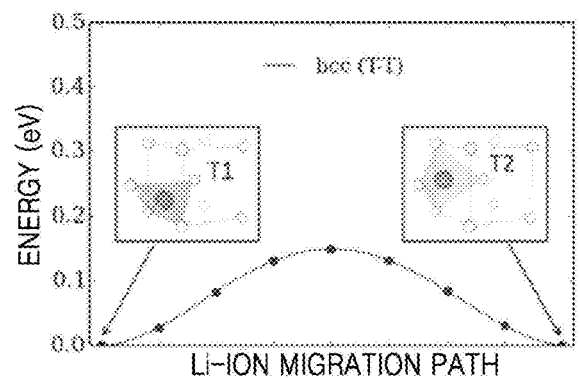
Figure 11B:
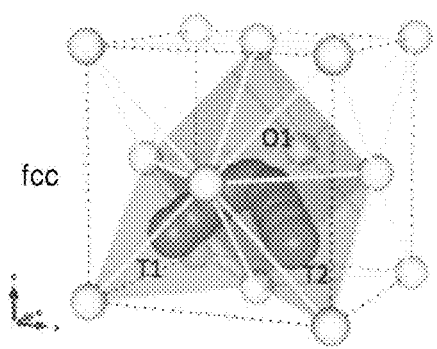
Figure 11E:
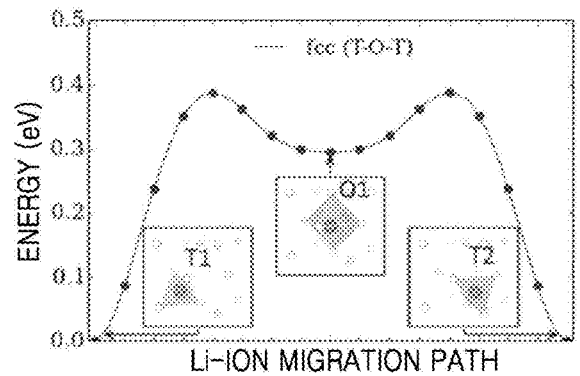
Figure 11C:
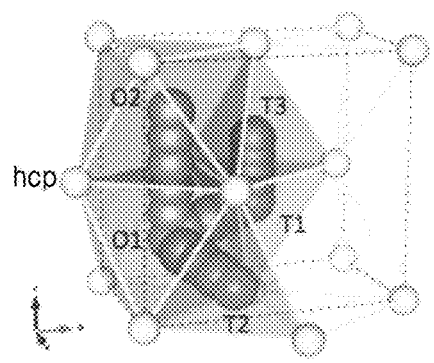
Figure 11F:
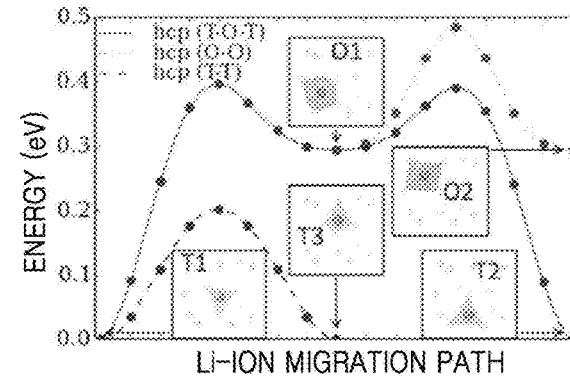
Figure 12:
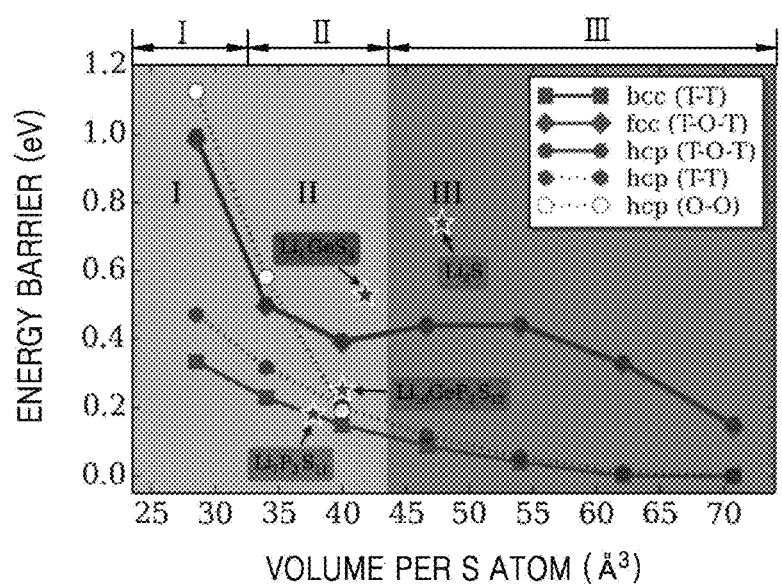
Figure 13:
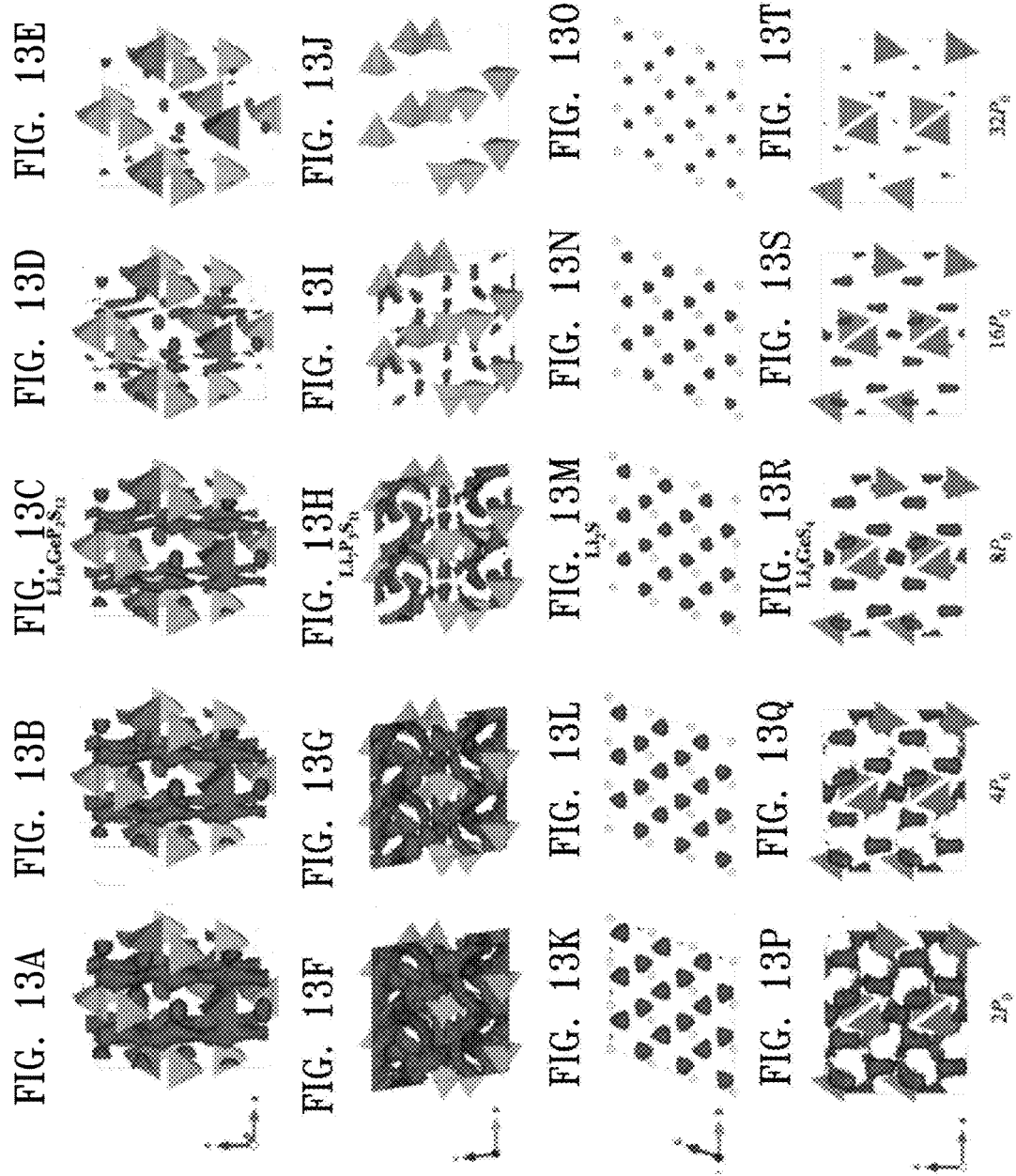
Figure 14:
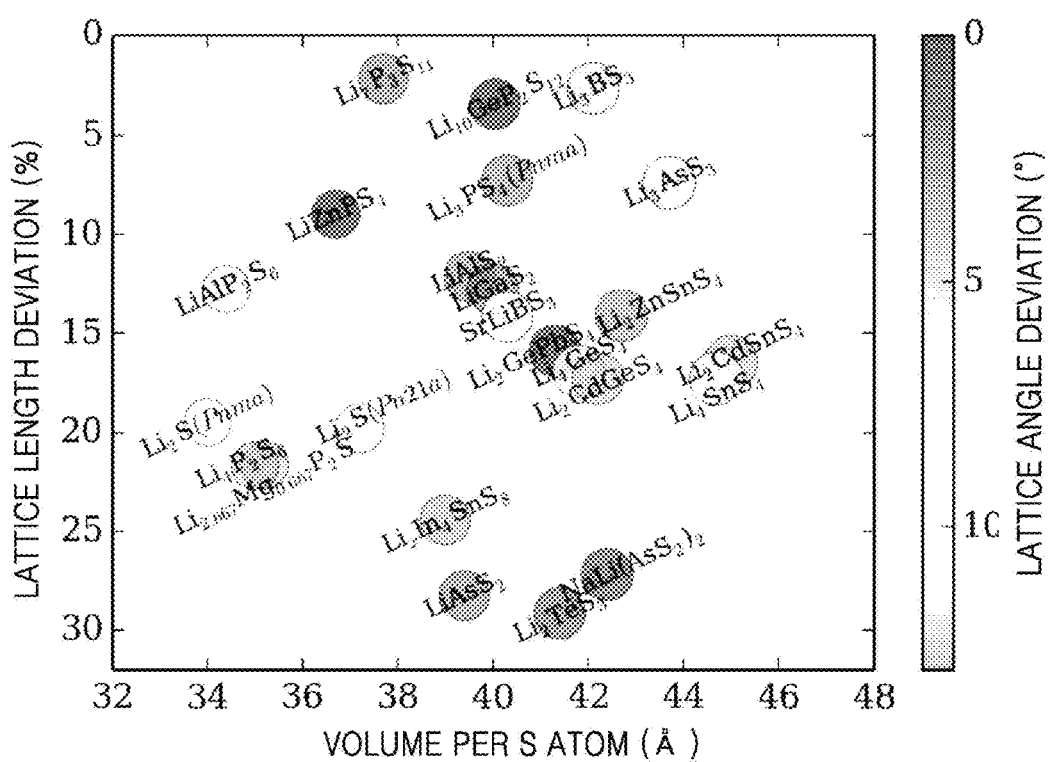
Figure 15:
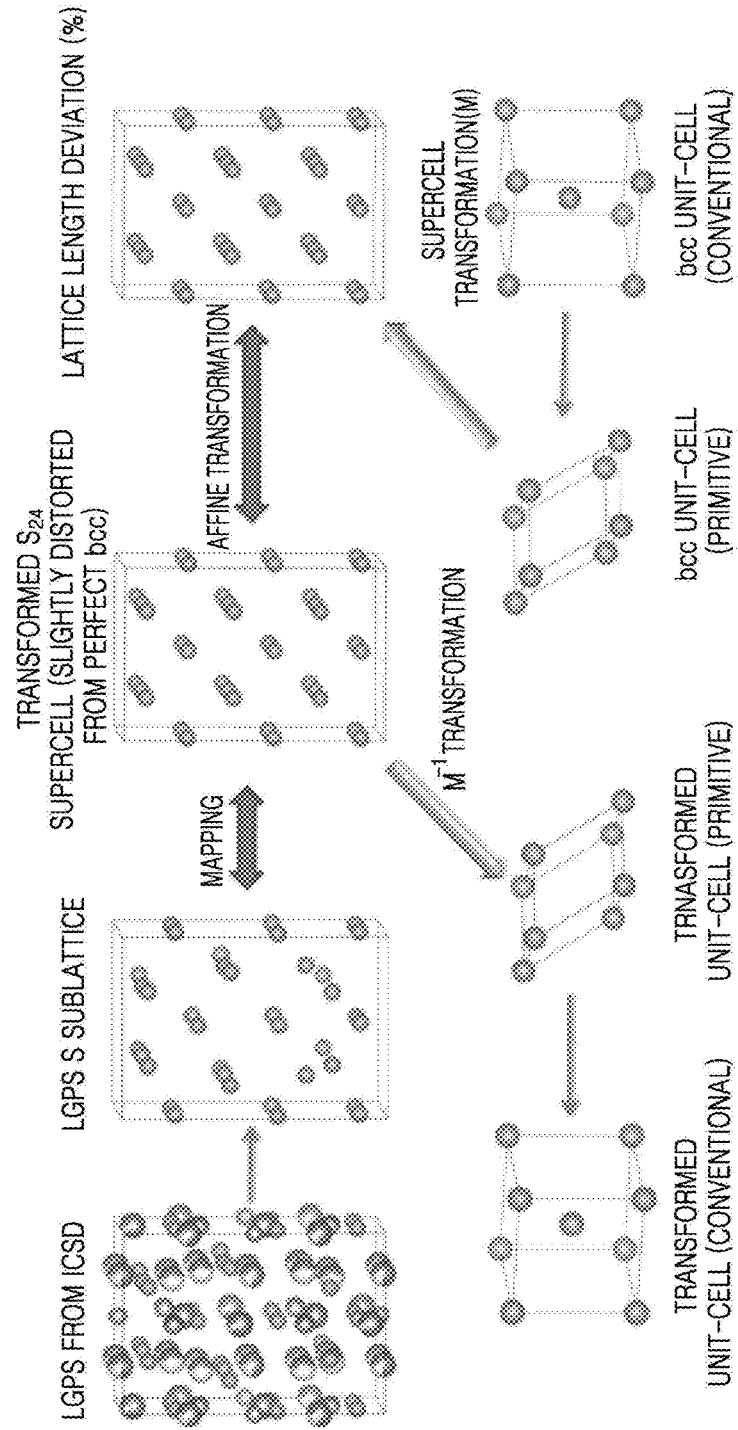
Figure 16:
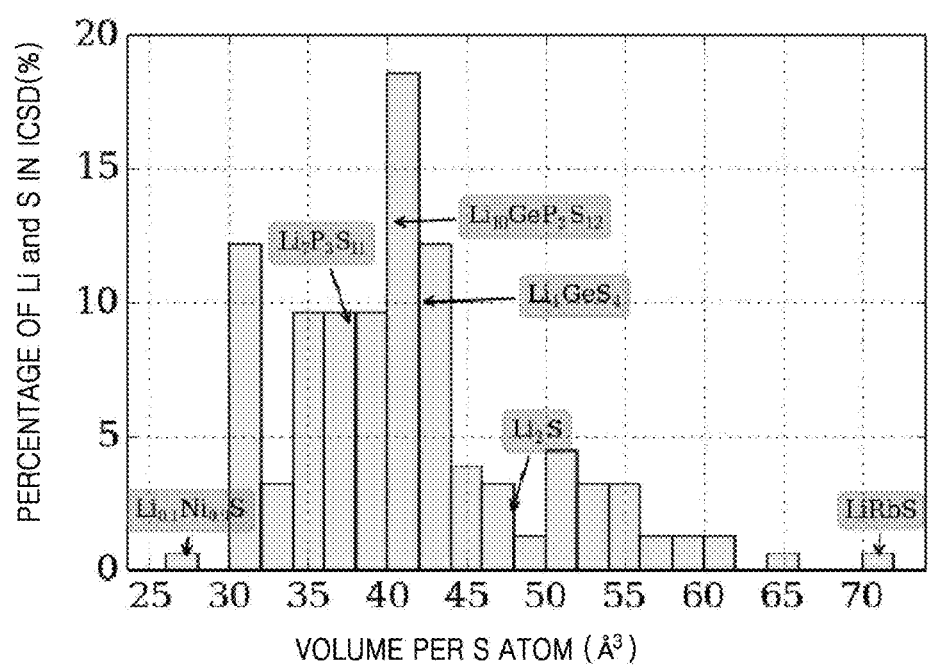
Figure 17:
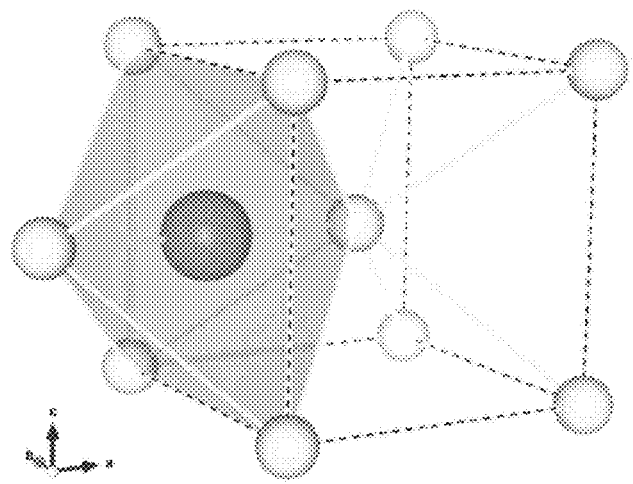
Figure 18:
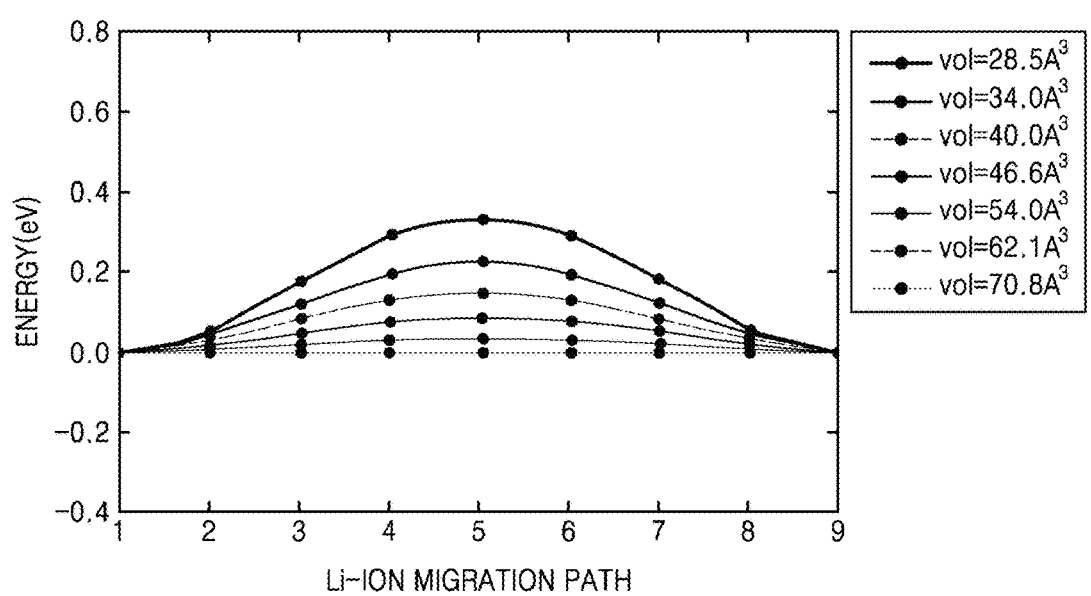
Figure 19:
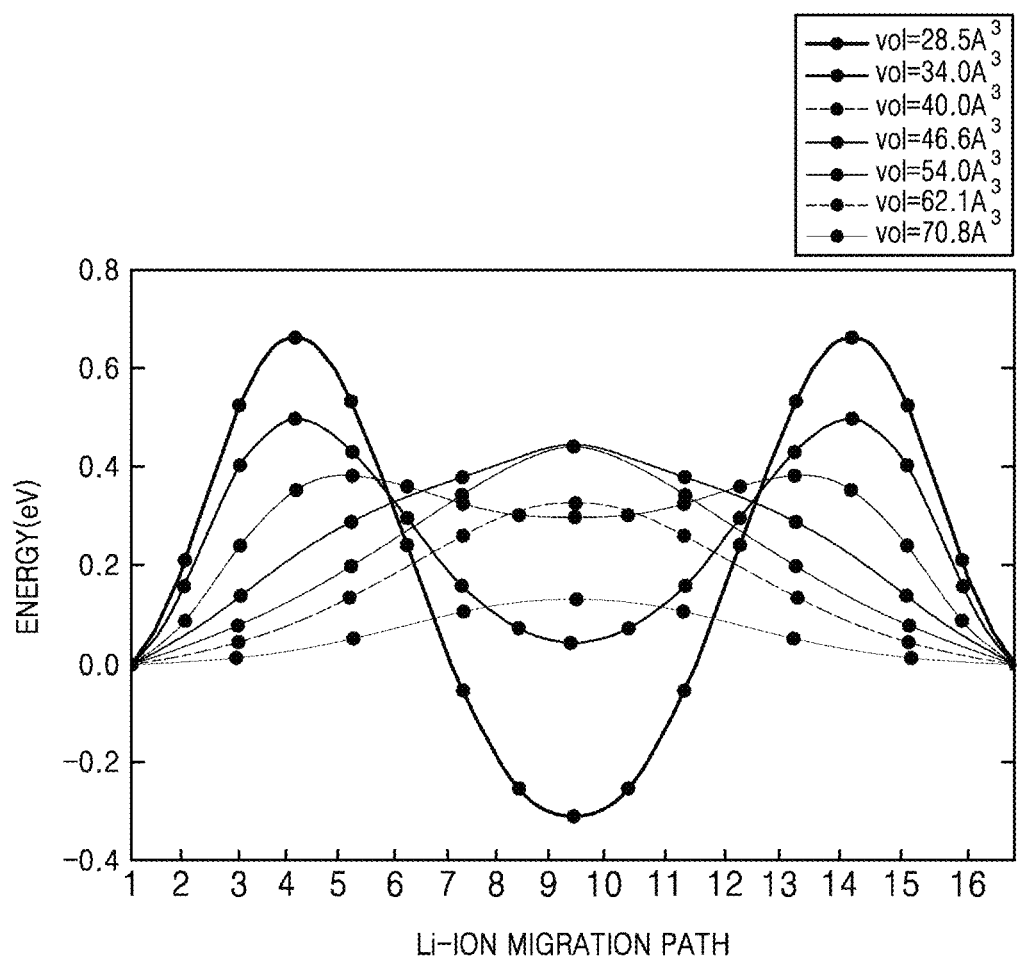
Figure 20A:
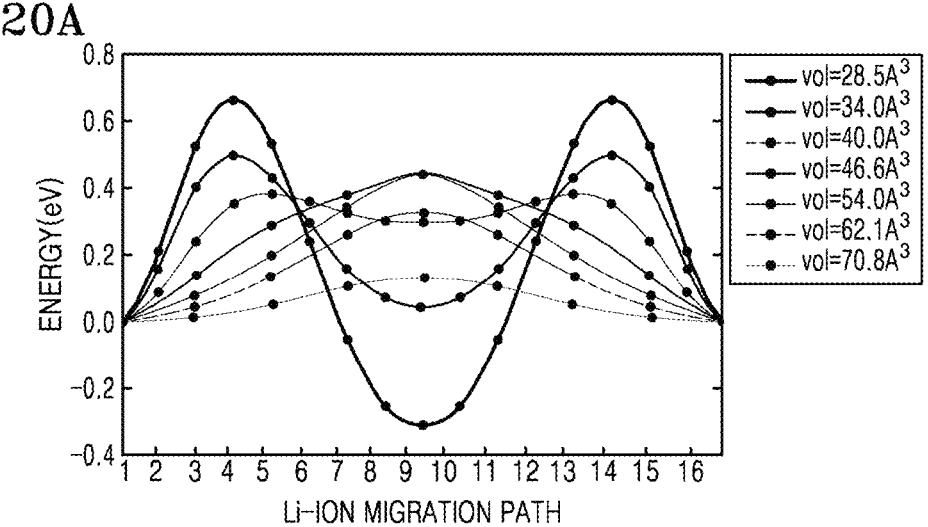
Figure 20B:
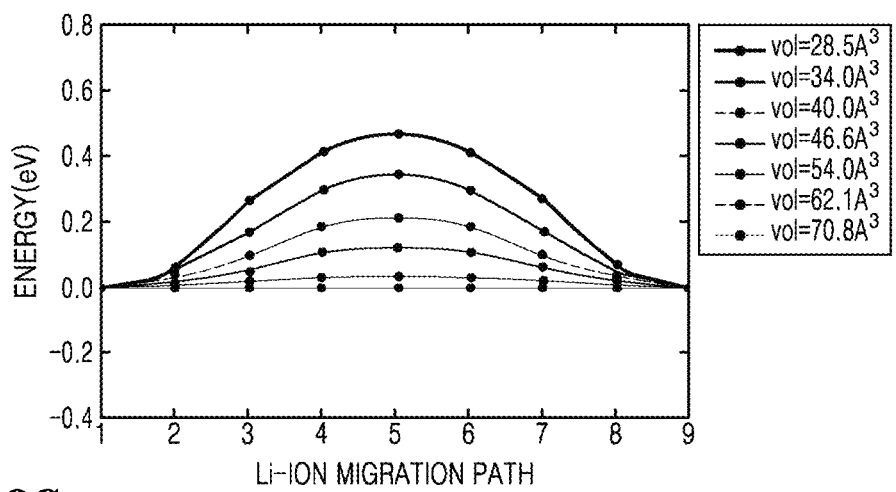
Figure 20C:
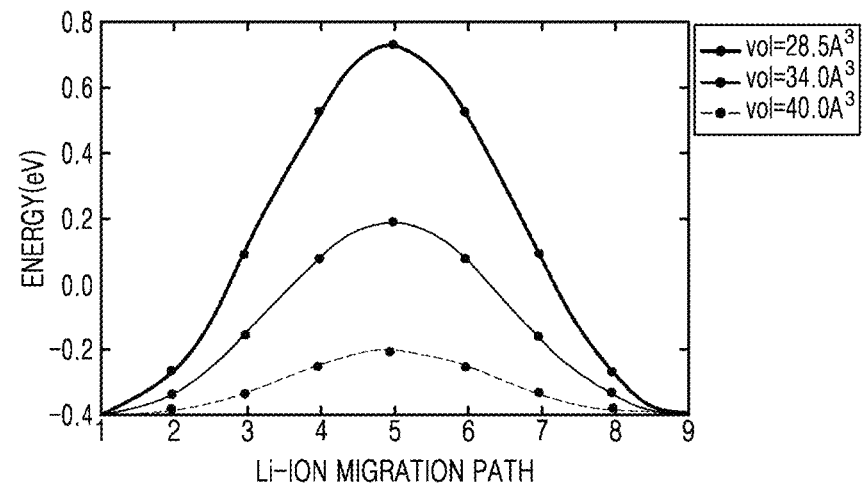
Figure 21:
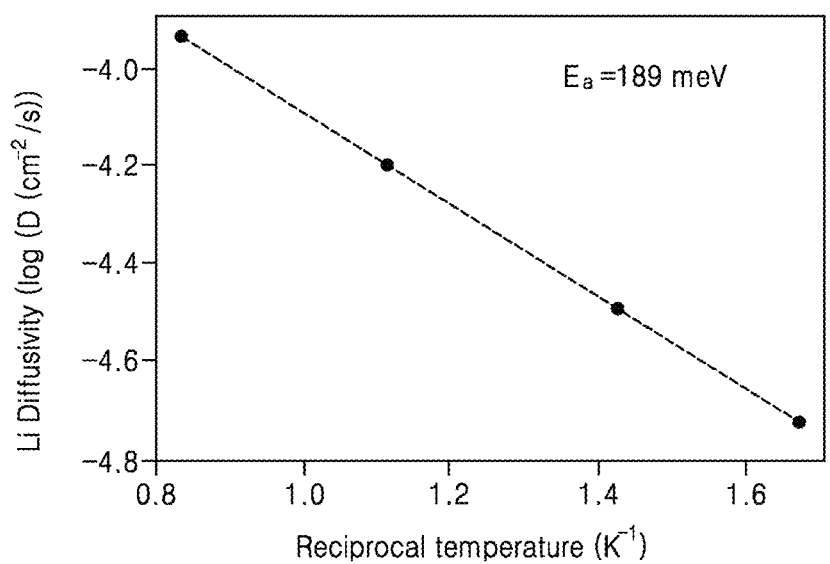
Figure 22A:
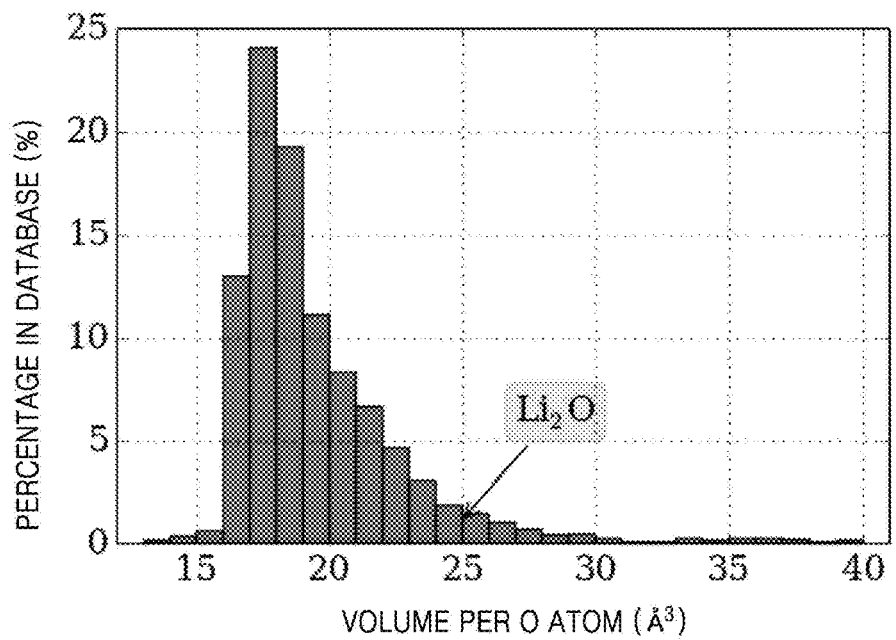
Figure 22B:
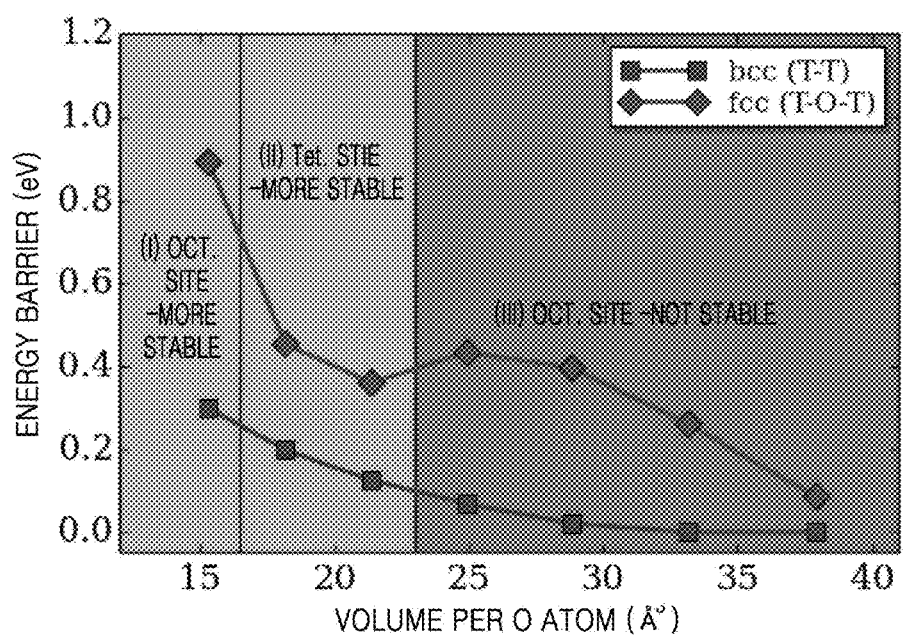
Figure 23A:
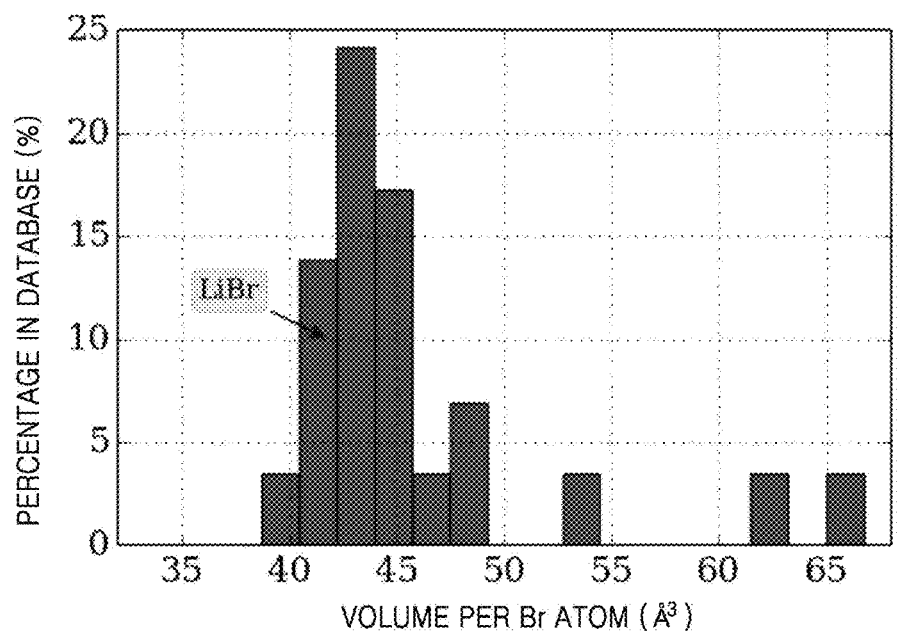
Figure 23B:
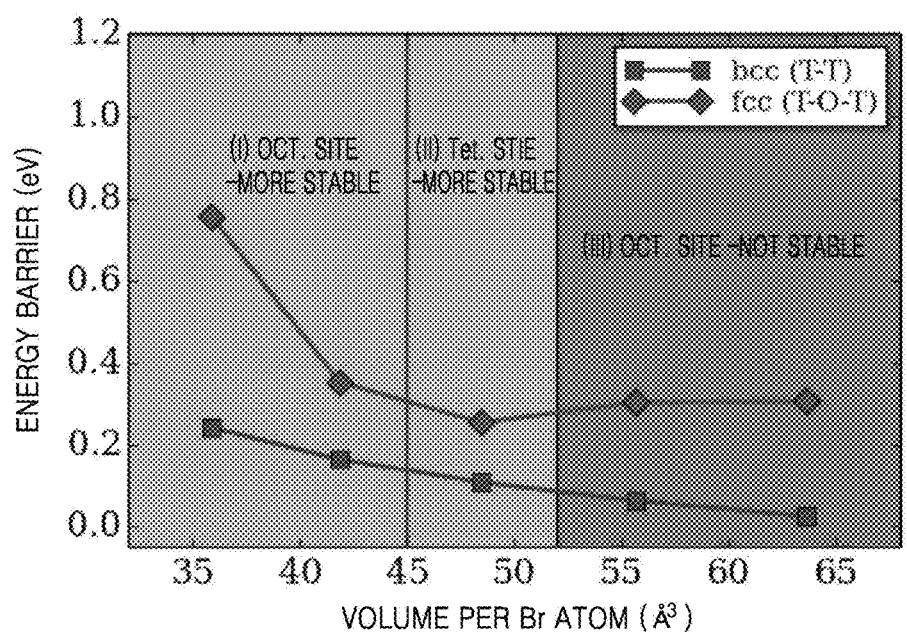
Figure 24A:
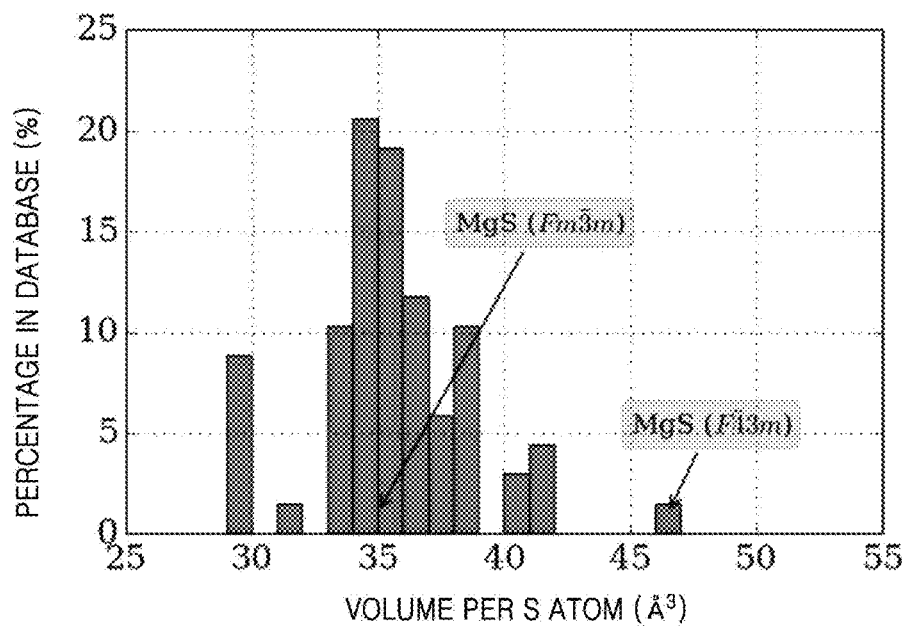
Figure 24B:
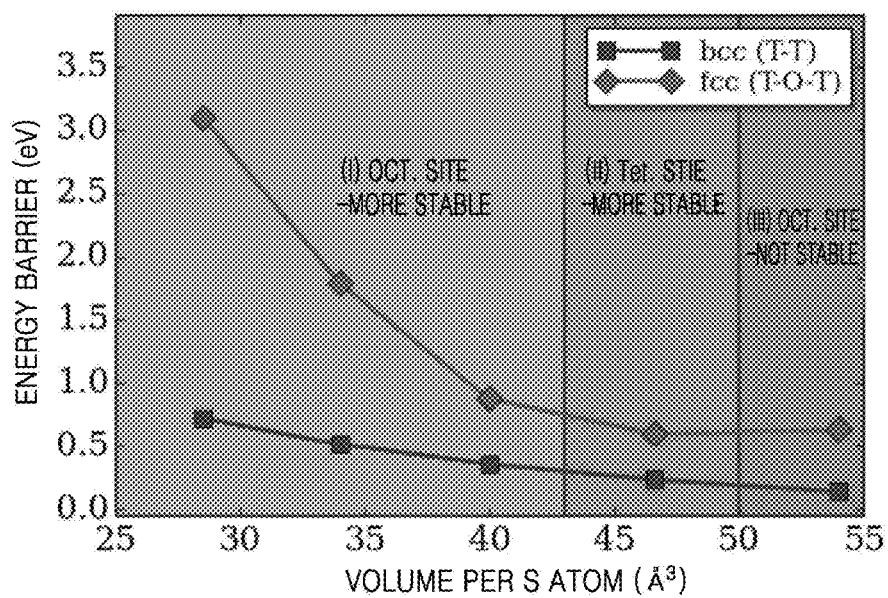
Figure 25A:
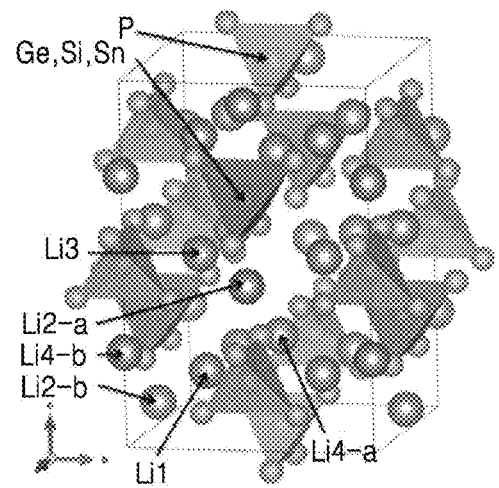
Figure 25B:
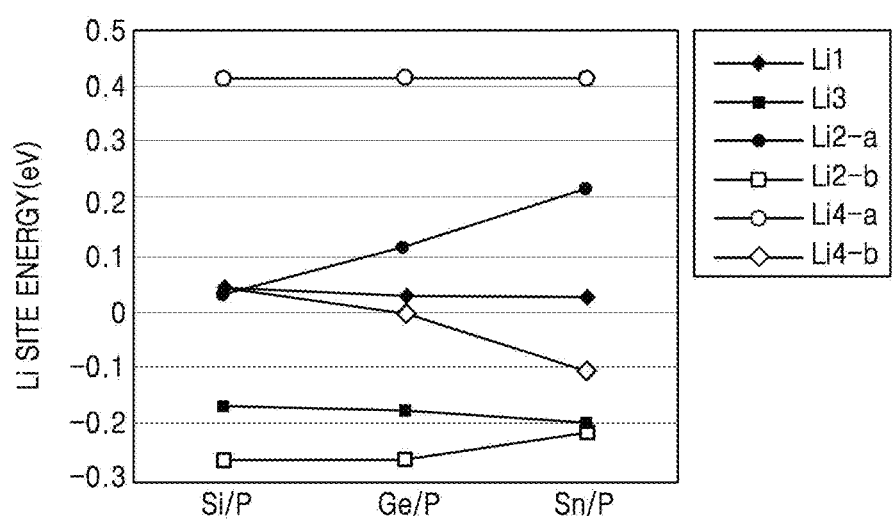

FIG. 8 is a cole-cole plot of imaginary impedance (Z", ohm centimeter, Ωcm) versus real impedance (Z', Ωcm) of solid electrolyte materials prepared according to Examples 5 to 7, at room temperature;

FIG. 9 is a graph of voltage (volts, V) versus battery capacity (milliampere hour per gram, mAh/g) shows a charging/discharging profile for an all-solid-state battery including a solid electrolyte material ($LiNi_{0.5}Mn_{0.3}Co_{0.2}O_2$, NCM) and an amorphous $Li_3PS_4$ as an electrolyte material, according to an embodiment;

FIGS. 10A to 10F shows results obtained by mapping the anion sublattice to a bcc/fcc/hcp framework in solid-state Li-ion conductors;

FIGS. 11A, 11B, and 11C show bcc/fcc/hcp-type anion lattices, and FIGS. 11D, 11E, and 11F are graphs of energy (eV) versus Li-ion migration path which show Li-ion migration pathways of the bcc/fcc/hcp-type anion lattices in FIGS. 11A to 11C, respectively;

FIG. 12 is a graph of energy barrier (eV) versus volume per S atom (cubic angstroms, $Å^3$), showing activation barriers for Li-ion migration versus lattice volume;

FIGS. 13A to 13T are illustrations showing Li ion probability densities in Li-ion conductors;

FIG. 14 is a graph of lattic length deviation (percent, %) versus volume per S atom ($Å^3$) and lattice angle deviation (°), and which shows screened inorganic crystal structure database (ICSD) compounds containing S and Li having a bcc-like anion framework using a structural matching algorithm;

FIG. 15 is a flowchart of the structural matching algorithm for $Li_{10}GeP_2S_{12}$ having an anion sublattice that closely matches to a bcc lattice;

FIG. 16 is a histogram of percentage of Li and S (%) versus volume per sulfur atom ($Å^3$) for materials in the ICSD containing Li and S but no other anion species (N, O, Se, F, Cl, Br, and I) or hydrogen;

FIG. 17 shows an octahedrally coordinated Li in a bcc sulfur lattice;

FIG. 18 is a graph of energy (eV) versus Li-ion migration path, which shows calculated minimal energy paths for Li-ion migration in the bcc sulfur lattice at different volumes;

FIG. 19 is a graph of energy (eV) versus Li-ion migration path, which shows calculated minimal energy paths for Li-ion migration in the fcc sulfur lattice at different volumes;

FIGS. 20A to 20C are graphs of energy (eV) versus Li-ion migration path, which show calculated minimal energy paths with types (a) T-O-T, (b) T-T, and (c) O—O for Li-migration in a hcp sulfur lattice at different volumes, respectively;

FIG. 21 shows an Arrhenius plot of Li-ion diffusivity (log(D (square centimeters per second, $cm^2/s$)) versus reciprocal temperature ($Kelvin^{-1}$, $K^{-1}$) for simulated $Li_7P_3S_{11}$ according to ab initio molecular dynamics (AIMD);

FIG. 22A is a histogram of percentage in database (%) versus volume per O atom ($Å^3$) for materials in the ICSD containing Li and O but no other anion species (N, S, Se, F, Cl, Br, or I) or hydrogen, and FIG. 22B is a graph of energy barrier (eV) versus volume per O atom (cubic angstroms, $Å^3$), which shows activation barrier as a function of volume obtained for the Li-ion migration paths in the bcc and fcc $O^{2-}$ sublattices;

FIG. 23A is a histogram of percentage in database (%) versus volume per Br atom for materials in the ICSD containing Li and Br but no other anion species (N, O, S, Se, F, Cl, or I) or hydrogen, and FIG. 23B is a graph of energy barrier (eV) versus volume per Br atom (cubic angstroms, $Å^3$), which shows activation barrier as a function of volume obtained for the Li-ion migration paths in the bcc and fcc Br-sublattices;

FIG. 24A is a histogram of percentage in database (%) versus volume per S atom for materials in the ICSD containing Mg and S but no other anion species (N, O, Se, F, Cl, Br, or I) or hydrogen, and FIG. 24B is a graph of energy barrier (eV) versus volume per S atom (cubic angstroms, $Å^3$), which shows activation barrier as a function of volume obtained for the Mg-ion migration paths in the bcc and fcc $S^{2-}$ sublattices; and FIG. 25A shows a ground-state structure of $Li_{10}MP_2S_{10}$, and FIG. 25B shows changes in Li site energy (eV) with cation substitution of $Li_{10}MP_2S_{10}$.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the FIGS., to explain aspects. As used herein, the term "and/or" includes any and all combinations of one or more of the associated listed items. Expressions such as "at least one of," when preceding a list of elements, modify the entire list of elements and do not modify the individual elements of the list.

In the present specification, when a portion "includes" an element, another element may be further included, rather than excluding the existence of the other element, unless otherwise described.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper,"

depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A sulfide solid electrolyte material is a material known in the art for use as a solid electrolyte for an all-solid-state lithium battery. The sulfide solid electrolyte material has high Li ion conductivity and small interface resistance between particles, and is beneficial in promoting high output of a battery. In particular, amorphous $Li_3PS_4$ has been reported as a material having excellent chemical stability.

However, amorphous $Li_3PS_4$ has a relatively low ion conductivity in a range of about 0.2 millisiemen per centimeter (mS/cm) to about 0.4 mS/cm. Therefore, when amorphous $Li_3PS_4$ having low ion conductivity is used as a solid electrolyte, the resistance of a battery increases, and accordingly, problems such as degradation of battery output or heat generation by the battery, may result. Therefore, it is desirable to develop a solid electrolyte having both high Li ion conductivity and excellent chemical stability.

The inventors have advantageously discovered that $LiZnPS_4$, which contains 4 moles of sulfur atoms with respect to 1 mole of lithium atom, is an excellent ionic conductor. On the basis of this discovery, a solid electrolyte having both high Li ion conductivity and excellent chemical stability has been developed.

Solid Electrolyte Material

According to an embodiment, a solid electrolyte material may be represented by Formula 1:

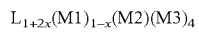      Formula 1

In Formula 1, L may be at least one element selected from a Group 1 element, M1 may be at least one element selected from a Group 2 element, a Group 3 element, a Group 12 element, and a Group 13 element, M2 may be at least one element selected from a Group 5 element, a Group 14 element, and a Group 15 element, M3 may be at least one element selected from a Group 16 element. The solid electrolyte material may have an I-4 crystal structure.

The solid electrolyte material having the configuration of Formula 1 and the I-4 crystal structure may exhibit both improved ion conductivity and stability against lithium metal degradation.

In an embodiment, in Formula 1, x may satisfy $0.3 \leq x \leq 0.9$. For example, x may satisfy $0.4 \leq x \leq 0.9$. For example, x may satisfy $0.5 \leq x \leq 0.9$. For example, x may satisfy $0.625 \leq x \leq 0.8$. For example, x may satisfy $0.625 \leq x \leq 0.75$. When x of Formula 1 is within the ranges above, a solid electrolyte may have further improved properties.

In an embodiment, L of Formula 1 may be at least one element selected from lithium (Li) and sodium (Na), but is not limited thereto. In some embodiments, L of Formula 1 may be any one of a Group 1 element. For example, L of Formula 1 may be Li.

In an embodiment, M1 of Formula 1 may be at least one element selected from beryllium (Be), magnesium (Mg), calcium (Ca), boron (B), aluminum (Al), silicon (Si), zinc (Zn), gallium (Ga), indium (In), and cadmium (Cd), but is not limited thereto. In some embodiments, M1 of Formula 1 may be any one element within the scope of M1 of Formula 1. In some embodiments, M1 of Formula 1 may be at least one element selected from Be, Mg, Ca, Zn, and Cd. For example, M1 of Formula 1 may be Zn.

In an embodiment, M2 of Formula 1 may be at least one element selected from phosphorus (P), germanium (Ge), tin (Sn), and arsenic (As), but is not limited thereto. In some embodiments, M2 of Formula 1 may be any one element within the scope of M2 of Formula 1. In some embodiments, M2 of Formula 1 may be at least one element selected from P and As. For example, M2 of Formula 1 may be P.

In an embodiment, M1 of Formula 1 may be Zn, and M2 of Formula 1 may be P.

In an embodiment, M3 of Formula 1 may be at least one element selected from oxygen (O), sulfur (S), and selenium (Se), but is not limited thereto. In some embodiment, M3 of Formula 1 may be any one element within the scope of M3 of Formula 1. In some embodiments, M3 of Formula 1 may be at least one element selected from S and Se. For example, M3 of Formula 1 may be S.

In an embodiment, the solid electrolyte material may include greater than 1 mole of L with respect to 4 moles of M3.

In an embodiment, the solid electrolyte material may include $[(M2)(M3)_4]^{3-}$ as an anion. For example, the anion may be $[PS_4]^{3-}$. Since the solid electrolyte material includes $[(M2)(M3)_4]^{3-}$ and does not include any other type of anion, it may achieve high chemical stability.

In an embodiment, the solid electrolyte material may not include a disulfide bond in the I-4 crystal structure. That is, the solid electrolyte material may achieve high chemical stability by excluding impurities, such as $[P_2S_6]^{4-}$ and $[P_2S_7]^{4-}$ anions, while including $[PS_4]^{3-}$ as an anion.

For example, the solid electrolyte material may be represented by Formula 2:

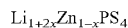      Formula 2

In Formula 2, $0.625 \leq x \leq 0.8$, and 1 mole of Zn from the solid electrolyte material may be replaced with 2 moles of Li to maintain a constant oxidation state in the solid electrolyte material.

In an embodiment, the solid electrolyte material may have the I-4 crystal structure. As used herein, the term I-4 crystal structure refers to a tetrahedral structure of $PS_4$ surrounded by Li and Zn having tetrahedral coordination, and may be a body-centered-cubic (bcc)-like structure. In such a bcc-like structure, an anion ($PS_4^{3-}$) sublattice allows Li ions to migrate within a network of interconnected tetrahedral sites, thereby leading to a lower activation energy barrier and a high ionic conductivity of greater than $2.9 \times 10^{-8}$ Siemen per centimeter (S/cm) at room temperature. In addition, since the $[PS_4]^{3-}$ anion is stable in air, the solid electrolyte material including the $[PS_4]^{3-}$ anion may have improved chemical stability.

The solid electrolyte material according to an embodiment has been discovered through the research and analytical processes described below, and thus without being limited by theory, the reasons for improved ionic conductivity and chemical stability are described in detail. However, while the present embodiments are provided to promote understanding of the solid electrolyte material, the invention should not be construed as being limited to the scope of the embodiments set forth herein.

In detail, the inventors have advantageously discovered $LiZnPS_4$ as a potentially good ionic conductor having an I-4 crystal structure, based on the results of analyzing solid electrolyte materials that are currently commerically available. The discovered material has lower or comparable conductivity to $Li_{10}GeP_2S_{12}$, but may be more easily synthesized at a lower cost, since the process and material do not rely on an expensive element, such as Ge. Accordingly, intensive studies have been made of analogues of $LiZnPS_4$, and consequently, the solid electrolyte material of the present inventive concept has been discovered.

Lithium solid electrolytes can potentially address two limitations of the organic electrolytes used in prior art lithium-ion batteries, namely, their flammability and limited electrochemical stability. However, achieving a $Li^+$ conductivity in the solid state which is comparable to other liquid electrolytes (e.g., >1 millisiemen per centimeter (mS/cm)) is particularly challenging. As disclosed herein, the inventors have revealed a relationship between anion packing and ionic transport in fast Li-ion conducting materials and expose example structural attributes, among others, for a number of Li ion conductors. Without being limited by theory, it is believed that an underlying bcc-like anion framework, which allows direct Li hops between adjacent tetrahedral sites, is desirable for achieving high ionic conductivity, and that this anion arrangement is present in several fast Li-conducting materials. These findings provide insight towards the understanding of ionic transport in Li-ion conductors and serve as design principles for future discovery and design of improved electrolytes for Li-ion batteries.

Safety issues are of immense concern in developing advanced energy storage technologies, especially for lithium-ion batteries. Commercially available Li-ion batteries contain a flammable organic liquid electrolyte which poses major technical challenges; a number of incidents of Li-ion battery fires caused by ignition of the electrolyte have been reported. Replacing the organic liquid electrolyte with a solid-state ionic conductor may improve device safety tremendously and remove one of the few remaining barriers to even wider scale use of Li-ion technology. Inorganic solid-state Li-ion conductors also benefit from other advantages related to electrochemical, mechanical, and thermal stability, absence of leakage, and the possibility of battery miniaturization.

Li-ion solid-state conductors desirably have high ionic conductivity at room temperature (RT) and low activation energy (Ea) for use over a broad range of operating temperatures. In addition, other properties such as electrochemical stability against the anode and cathode, and environmental stability, are also desirable as they reduce the complexity of the battery.

Herein, a systematical description is provided of example attributes of compounds that lead to high Li-ion conductivity, thereby developing specific example criteria by which to identify improved conductors. Without being limited by theory, it has been found that the topology of the particular example anion arrangement is a factor in determining intrinsic Li-ion mobility. For example, a bcc anion sublattice allows the lowest activation barrier and greatest ionic conductivity, which is a rare feature in known materials. The present disclosure explains the observed conductivity trends in known Li-ion conductors, and can be used to design new ionic high performance materials.

One basic step in ionic diffusion is the migration of ions between stable sites through a higher energy environment. The highest energy along this path is the activation energy for migration, which in good ionic conductors, contributes the main component to the activation energy for long-range diffusion. The stable site for Li in ionic materials is usually a tetrahedral or octahedral site connected to other polyhedral sites in the structure through shared anion triangles. Examples of such paths in common battery cathode materials, such as spinel oxides or rocksalt-type oxides, are well established. To understand the topology of sites in good Li-ion conductors, disclosed herein is an examination of the crystal structure of two compounds having high Li-ion conductivity, $Li_{10}GeP_2S_{12}$ and $Li_7P_3S_{11}$. The structure of $Li_{10}GeP_2S_{12}$ can be characterized by predominantly tetrahedral coordination of Li, Ge, and P cations within a tetragonal lattice. In the structure of $Li_7P_3S_{11}$, corner-sharing $P_2S_7^{4-}$ ditetrahedra and $PS_4^{3-}$ tetrahedra are surrounded by Li ions primarily having tetrahedral coordination. To abstract and understand the anion arrangements in these structures better, a structure matching algorithm is applied to map the sulfur positions to three crystal lattices: bcc, face-centered-cubic (fcc), and hexagonal close-packed (hcp) lattices. Despite seeming to be very different structures, the sulfur sublattices of both $Li_{10}GeP_2S_{12}$ and $Li_7P_3S_{11}$ very closely match a bcc lattice. The matchings are graphically shown in FIGS. 10A and 10B, and details of the algorithm and the matching results are described in the Examples, with reference to FIGS. 15 and 16.

Figure 10A:
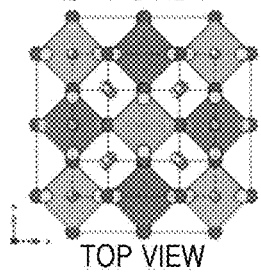
Figure 10B:
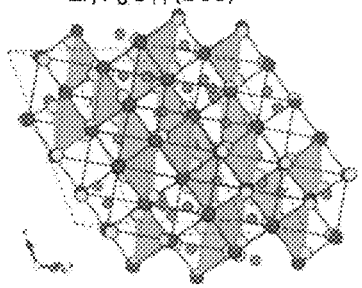
Figure 10D:
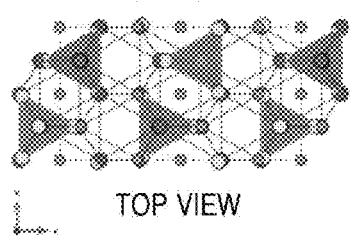
Figure 10E:
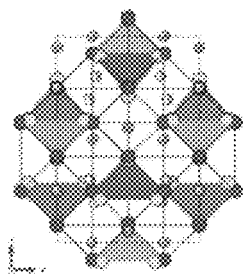
Figure 10C:
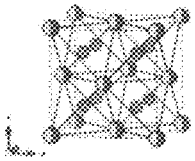
Figure 10F:
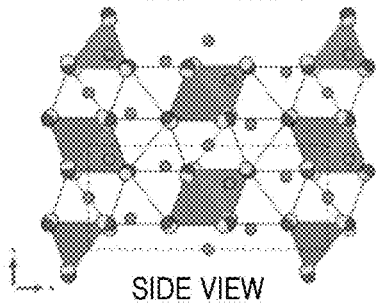

To explain the predominance of bcc sulfur frameworks in high-conductivity solid electrolytes, the calculated $Li^+$ migration barrier is compared within the bcc, fcc and hcp $S^{2-}$ anion lattices in the dilute limit of a single $Li^+$ in a fixed $S^{2-}$ lattice with no other cations present. This computational experiment allows for the direct assessment of the effect of the anion configuration. The fcc and hcp lattices are present in many lithium sulfide materials, for example $Li_2S$ has an fcc sulfur sublattice (FIG. 10C), and $Li_4GeS_4$, the parent structure of $Li_{10}GeP_2S_{12}$ and other thio-LISICONs, has an hcp sulfur sublattice (FIG. 10D). A lattice volume of 40 Å³ per S atom (the same as $Li_{10}GeP_2S_{12}$) may be used to keep the same free volume for Li diffusion in all anion lattices. The migration paths and their energy are shown in FIGS. 11A to 11F.

As disclosed herein, Li is most stable in the tetrahedral site. In the bcc $S^{2-}$ lattice, the Li ion migrates with a remarkably low barrier of only 0.15 electron volts (eV) along a path connecting two face-sharing tetrahedral sites (T1 and T2 in FIGS. 11A and 11D), hereafter denoted as the "T-T" path. In the fcc anion lattice, Li migration between two tetrahedral sites (T1 and T2 in FIG. 11E) is via an intermediate octahedral site (O1), hereafter denoted as the "T-O-T" path. The presence of the octahedral site along the path makes the barrier for T-O-T type migration in fcc much higher (e.g., 0.39 eV at this volume). The T-O-T type path can be also found in the ab-plane of the hcp lattice (T1 to T2 through O1 in FIG. 11F) with an almost identical activation barrier (e.g., 0.40 eV). Li migration along the c-axis of the hcp lattice is primarily though a path connecting two face-sharing tetrahedral sites (T1 and T3) with a lower barrier (e.g., 0.20 eV), but Li does not percolate and Li migration thus occurs through octahedral sites to achieve long-range Li diffusion. Li could also migrate between face-sharing octahedral sites (O1 and O2, 0.19 eV) along the c-axis, however additional activation energy is used to access this path as the octahedral sites are unstable. Therefore, without being limited by theory, it is believed that Li conduction in an hcp lattice likely occurs by an alternation of T-T and T-O-T hopping, and the T-O-T hops, with higher energy barriers, are the rate-limiting steps. At room temperature this difference in activation energies between the bcc T-T path and hcp/fcc T-O-T paths corresponds to about three orders of magnitude difference in conductivity (σ), according to the Equation 1:

$$\sigma \propto \exp(-E_a/Kt) \quad \text{Equation 1:}$$

Volume can be an important factor in ion mobility. An evaluation is conducted of the previously discussed migration barriers in all three lattices as a function of volume between 28.5 cubic angstroms $(Å^3)/(S$ atom) to 70.8 $Å^3/(S$ atom), which is the range observed in the Inorganic Crystal Structure Database (ICSD) for compounds that include Li and S, but do not include N, O, Se, F, Cl, Br, I or H (FIG. 16). As shown in FIG. 12, for the bcc lattice the tetrahedral site is lowest in energy at all volumes (FIG. 17 and Table 1), with the Li migration barrier monotonically decreasing as volume increases.

TABLE 1

| Materials | Anion Lattice type | a(Å) | b(Å) | c(Å) | α(°) | β(°) | γ(°) | R(Å) |
|---|---|---|---|---|---|---|---|---|
| Li$_{10}$GeP$_2$S$_{12}$ | bcc | 4.35 | 4.35 | 4.20 | 90.0 | 90.0 | 90.0 | 0.58 |
| Li$_7$P$_3$S$_{11}$ | bcc | 4.19 | 4.29 | 4.20 | 90.2 | 87.4 | 90.7 | 0.82 |
| Li$_2$S | fcc | 5.76 | 5.76 | 5.76 | 90.0 | 90.0 | 90.0 | 0.0 |
| Li$_4$GeS$_4$ | hcp | 3.87 | 4.01 | 6.15 | 90.0 | 90.0 | 118.9 | 0.27 |

The bcc arrangement remains optimal for Li mobility across all volumes (FIG. 12). In fcc and hcp lattices the Li migration mechanism varies with the lattice volume. At small volumes (region I in FIG. 12), the most stable Li sites are octahedral due to the larger size of this site and the activation barrier is large due to a large energy penalty when Li ion passes through a small three-coordinated bottleneck. As the volume gets larger (region II in FIG. 12), the tetrahedral site becomes more stable, and the activation energy decreases. The crossover in site energies creates non-monotonic behavior of the migration energy with volume in these close-packed lattices. At larger volumes (region III in FIG. 12), the octahedral site is no longer stable, and Li migration occurs directly between two tetrahedral sites thus bypassing the center of the octahedra, with a decreasing barrier as the volume further increases. The octahedral site is found to be unstable over the entire range of considered volumes (Table 2).

TABLE 2

| Volume per S(Å$^3$) | 28.5 | 34 | 40.0 | 46.6 | 54.0 | 62.1 | 70.8 |
|---|---|---|---|---|---|---|---|
| $E_{oct}$-$E_{tet}$(eV) | 0.74 | 0.55 | 0.40 | 0.29 | 0.20 | 0.14 | 0.09 |

The detailed results for the energy path of Li-ion migration in structures with different volumes are shown in FIGS. 18, 19, and 20A to 20C. The results in FIG. 12 thus indicate that bcc is an optimal anion arrangement for Li-ion conductors due to the low barrier of the T-T path.

Figure 3:
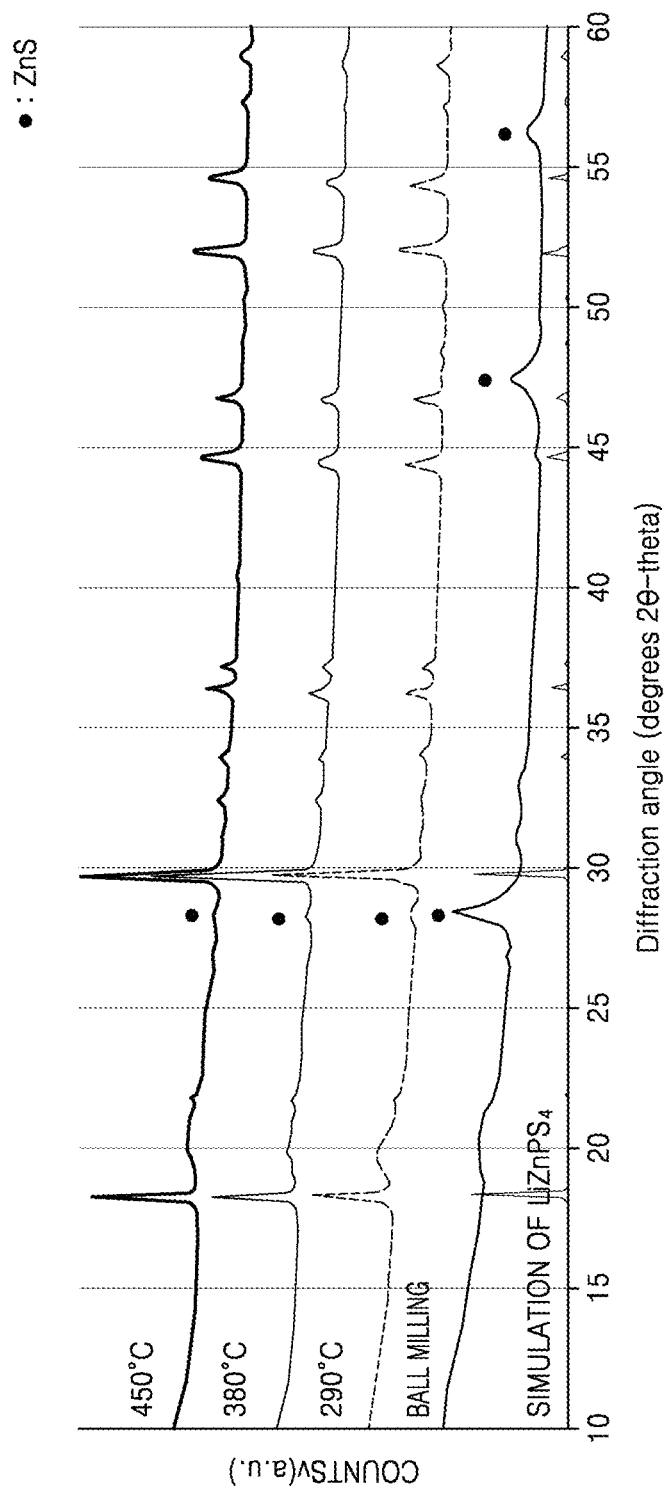
FIG. 3 is a graph of counts (arbitrary units, a.u.) versus diffraction angle (degrees 2-theta) which shows the X-ray diffraction spectroscopy (XRD) patterns of an $LiZnPS_4$ compound sintered at different temperatures.

The above model analysis is validated by comparing it to the experimental activation energy of real compounds. The calculated 0.15 eV barrier in the bcc sulfur lattice with a volume of 40 $Å^3$ is only slightly lower than the experimentally determined activation energies of Li$_{10}$GeP$_2$S$_{12}$ (e.g., 0.25 eV or 0.22 eV) and other derivatives with similar structures (e.g., 0.22 eV of Li$_7$GePS$_8$, 0.20 eV of Li$_{10}$SiP$_2$S$_{12}$ and 0.27 eV of Li$_{10}$SnP$_2$S$_{12}$), and is close to that of Li$_7$P$_3$S$_{11}$ (e.g., 0.18 eV) with a similar volume (e.g., 37.7 $Å^3$), as shown in FIG. 3. The experimental activation energies of Li$_2$S (e.g., 0.74 eV with volume of 47.8 $Å^3$) and Li$_4$GeS$_4$ (e.g., 0.53 eV with volume of 41.8 $Å^3$), are also close to the barriers calculated for fcc (e.g., 0.44 eV at V=46.6 $Å^3$) and hcp lattices (e.g., 0.40 eV at V=40.0 $Å^3$), respectively. The barriers for real compounds can be higher than those in the model analysis, as the electrostatic interaction between the migrating Li and the other cations may be the highest in the activated state, so adding the relevant cations in the simulations would increase activation energies.

The analysis of differences in the diffusion mechanisms of bcc, fcc, and hcp sulfur lattices are further confirmed by the probability density of Li ions as obtained from ab initio molecular dynamics (AIMD) simulations for several Li-ion conductors (FIGS. 13A to 13T). The simulations are performed at 900 K to speed up diffusion and reduce the simulation time. The probability density is defined as the time-averaged spatial occupancy probability of Li-ions in the crystal structure, and is inversely correlated to the Li site energy. For two sites with probabilities P$_1$ and P$_2$, the difference in their free energies can be given approximately by Equation 2:

$$\Delta G = -kT \ln(P_1/P_2). \quad \text{Equation 2:}$$

At 900 K, each doubling of probability corresponds to a decrease in Li site energy of about 50 millielectron volts (meV).

The distribution of Li ions in Li$_{10}$GeP$_2$S$_{12}$ demonstrates that conduction occurs predominantly via the channels connecting tetrahedrally coordinated Li sites along the c-axis (FIGS. 13A to 13E). Notably, the probability density extends between these tetrahedral sites with relatively large probabilities, suggesting high Li occupancy along the diffusion channels, which is also seen experimentally. The evenly distributed probability densities indicate that Li ions have a relatively flat energy landscape along the channels, and the energy barriers for diffusion between these sites are low, in agreement with the analysis results of the bare sulfide lattices. In Li$_7$P$_3$S$_{11}$, the probability densities form a three-dimensional Li diffusion network (FIGS. 13F to 13J). As compared to Li$_{10}$GeP$_2$S$_{12}$, the densities in Li$_7$P$_3$S$_{11}$ are more evenly distributed within the diffusion network, confirming the small activation energy of 0.18 eV (e.g., 0.19 eV) reported experimentally (computationally, see FIG. 21), and are even lower than that of $Li_{10}GeP_2S_{12}$ (e.g., 0.22~0.25 eV). In contrast, Li ions are almost exclusively found on the isolated tetrahedral sites in the fcc sulfur framework of $Li_2S$ (FIGS. 13K to 13O) even when Li vacancies are induced. The Li occupancy is negligibly small at the octahedral sites, which connect the tetrahedral sites and form a percolating diffusion network. The absence of a connected diffusion network indicates that the Li ions hop through these octahedral sites at a very low frequency, and that the octahedral-site energies are much higher than in the tetrahedral sites, again in agreement with the results on the bare sulfide lattices. In $Li_4GeS_4$, which has an underlying hcp sulfur lattice, the probability densities are localized in pairs of face-sharing tetrahedral sites (elliptical regions in FIGS. 13P to 13T), corresponding to the T-T path (FIG. 13K to 13O). A percolation network for long-range Li diffusion can be only formed through the bridging octahedral sites, which have significantly smaller occupation probability. Therefore, the energy landscape for Li-ions in $Li_4GeS_4$ and $Li_2S$ is considerably more corrugated than in $Li_{10}GeP_2S_{12}$ or $Li_7P_3S_{11}$, leading to the higher activation energies found in $Li_4GeS_4$ and $Li_2S$.

A basic principle for the design of Li-ion conductors with low activation energy can be distilled from the above findings: it is desirable that each of the sites within the diffusion network be energetically equivalent or close to equivalent. The superior ionic conductivity of Li-ion conductors having a bcc-like anion framework, e.g., $Li_{10}GeP_2S_{12}$ and $Li_7P_3S_{11}$, is due to the primarily tetrahedral coordination of the Li ions and their geometric similarity to the bcc anion sublattice, which contains a percolating network composed entirely of tetrahedral sites that are crystallographically and energetically equivalent. This is unlike structures with the hcp or fcc anion frameworks, which migrate through sites with very different coordination (e.g., 4- and 6-coordination) to achieve percolation.

FIG. 14, shows the results of the Li-containing sulfides from ICSD screened using the bcc framework matching algorithm, in which transition-metal (TM) containing compounds are excluded as TM cations since they can be easily reduced against the lithium anode. Only 24 compounds can be matched to bcc, and most of them are significantly distorted from a perfect bcc lattice. The superionic conductors $Li_{10}GeP_2S_{12}$ and $Li_7P_3S_{11}$ are among the few sulfides that are well matched to bcc. This screening demonstrates that the bcc framework serves as a descriptor for Li-ion conductors with high conductivity. A few other Li-ion conductors, such as $Li_3BS_3$ and $\beta\text{-}Li_3PS_4$ (e.g., space group: pnma), which are reported to exhibit high conductivities and low activation energies, also emerge from this screening. As the bcc framework is much less common for anions than hcp or fcc, very high ionic conductivity is limited to a small group of compounds.

The above principle may also be transferable to other combinations of mobile cations and immobile anion lattices. For example, in the Li-ion conductors $Li_3OCl$ and $Li_3OBr$ having an anti-perovskite structure, the oxygen and halide anions are bcc packed. With the presence of Li interstitials, the activation energy can be as low as 0.17 eV as they activate a path connecting energy equivalent tetrahedral sites. The fast $Ag^+$ and $Cu^+$ conducting halides and chalcogenides (e.g., $\alpha$-AgI) also have bcc anion sublattices, and possess higher ionic conductivities than fcc and hcp-based phases. Consistent with these findings, calculations indicate that in lattices formed by $O^{2-}$ or halide anions (e.g., $Br^-$—), the Li migration barrier in bcc-type anion frameworks are also lower than that of other close-packed types (FIGS. 22A, 22B, 23A and 23B). Moreover, we find that a bcc anion sublattice is also superior for $Mg^{2+}$ ion migration than the other close-packed types (FIGS. 24A and 24B), and such information could be useful for the design of multivalent solid-state battery systems. In addition, although low activation energies are predicted for oxides with bcc oxygen framework (FIG. 22), the higher activation energy found in oxides comes at least from the much lower frequency with which oxygen takes on a bcc-like arrangement compared to sulfur, and from the smaller volume and reduced polarizability of oxides, which increases the electrostatic interactions between the migrating ion and the other cations.

While the underlying anion sublattice dominates the activation energy by setting the site connectivity, the presence of the other lithium and non-lithium cations will modify the migration energy from what can be achieved in the bare lattice. When multiple non-Li cations share the same type of site in the crystal structure (e.g., Ge/P in $Li_{10}GeP_2S_{12}$), they can locally modify the energy landscape, thereby creating additional barriers. The attraction of Li ions or vacancies to one of the metal cations is a manifestation of this. Hence, doping may be performed with cations that are close to each other in the periodic table and chemically similar. This local cation effect can also be used as an advantage by appropriately engineering site energies in a structure to reduce the energy difference between Li occupation in different sites. For example, the substitution of Ge by Si (e.g., an element closer to P in the Periodic Table) in $Li_{10}GeP_2S_{12}$ lowers its activation energy by 0.01 eV (e.g., confirmed by experiment, 0.05 eV lower), while replacing Ge with Sn (e.g., less similar to P) increases it by 0.03 eV (e.g., confirmed by experiment, 0.02 eV higher). The changes in activation energy thus can be explained by the changes in Li site energies associated with the cation substitution (FIGS. 25A and 25B). In addition, the ionic conduction mechanism and conductivity may be modified by changing the Li concentration. In garnet-type $Li_xLa_3M_2O_{12}$ (M denotes various metallic or metalloid cations) ionic conductors, it is found that as the Li concentration increases from x=3 to x=7, the limited number of tetrahedral sites and the electrostatic repulsion among Li ions, force the Li ions to the higher energy octahedral sites. This eliminates the large energy difference between the tetrahedral and octahedral site, resulting in a lower activation energy and higher Li conductivity.

In summary, the influences of the anion-host matrix on the ionic conductivity of solid-state Li-ion conductors are disclosed herein. On this basis, an example descriptor emerges in which anion sublattices with bcc-like frameworks can be superior for Li-ion diffusion leading to a lower activation barrier than in other close-packed frameworks. The bcc anion framework allows the Li ions to migrate within a network of interconnected tetrahedral sites possessing equivalent energies. This insight has predictive power and can serve as valuable design guidelines for developing fast ion-conducting materials with improved properties, as well as for further searches for new types of Li-ion conductor materials.

Crystal structure analysis, Li-ion migration barrier calculation, and Li-ion probability density calculation for performing the research and the studies above are carried out in the following manner.

Crystal Structure Analysis

A structural matching algorithm may be used to map the anion sublattice structure of Li-ion conductors into a bcc, fcc, or hcp framework, and may be implemented using the Python Materials Genomics (pymatgen) open-source library. The algorithm finds the supercell and facilitates affine transformation mapping of the input bcc, fcc, or hcp lattice exactly onto the lattice of the target structure, while minimizing the root-mean-square distance from the atoms in the transformed (and slightly distorted) bcc/fcc/hcp-like supercell structure to the corresponding atoms in the target structure. An example of a method of matching $Li_{10}GeP_2S_{12}$ to a bcc S lattice is described in FIG. 15. The structural matching results are visualized using VESTA.

Li-Ion Migration Barrier Calculations.

Density functional theory based on the Perdew-Burke-Ernzerhof (PBE) generalized gradient approximation, with interactions between ion cores and valence electrons described by the projector augmented wave (PAW) method as implemented in the VASP package, may be used. The VASP pseudopotential set of Li (e.g., PAW_PBE Li 17 Jan. 2003), S (e.g., PAW_PBE S 17 Jan. 2003), P (e.g., PAW_PBE P 17 Jan. 2003), Ge (e.g., PAW_PBE Ge 5 Jan. 2001), Si (e.g., PAW_PBE Si 5 Jan. 2001) and Sn (e.g., PAW_PBE Sn_d 6 Sep. 2000) may be used. Activation barriers for a Li-ion in sulfur bcc/fcc/hcp lattices are calculated using the climbing-image nudged elastic band method (CI-NEB) in a large supercell comprises 3×3×3 conventional unit-cells to minimize the interaction between the periodic images. A 2×2×2 k-point grid may be used and the cutoff of the kinetic energy set to 500 eV for all CI-NEB calculations. The supercells containing excess electrons are compensated with a uniform background charge.

Li-Ion Probability Density Calculations

The lithium ionic probability densities (IPD) may be calculated from the atom trajectories monitored during the AIMD simulations. The simulations are performed on the canonical ensemble with a time step of 2 femtoseconds, with simulations lasting 200 picoseconds for statistical analysis. A gamma-point-only sampling of k-space and a lower plane-wave energy cutoff of 280 eV may be used for all AIMD simulations. The IPD values within a structure are calculated by subdividing the supercell into a grid of cubic cells with an edge length of 0.2 Å and counting the number of time steps in which each cell is occupied by a Li-ion. The total ionic probability density is calculated by Equation 3:

$$\int_\Omega P_i = N/\Omega, \quad \text{Equation 3}$$

In Equation 3, N is the number of Li ions in the unit-cell and Ω is the volume of the unit-cell. Li vacancies are introduced in calculations of $Li_2S$ and $Li_4GeS_4$ (6% and 9% of the Li ions are removed from the supercell of $Li_2S$ and $Li_4GeS_4$, respectively), as stoichiometric $Li_2S$ and $Li_4GeS_4$ do not show significant Li diffusion and a converged AIMD simulation takes a longer simulation time. The simulation results are shown in FIGS. 10A to 10F.

As such, the inventors have investigated crystal structures of $Li_{10}GeP_2S_{12}$ and $Li_7P_3S_{11}$ and changes in the Li-ion conductivity and activation energy according to types of elements positioned in the lattice points. On the basis of data obtained therefrom, $LiZnPS_4$ having an I-4 crystal structure has been discovered as a potentially good ionic conductor. Thus, a solid electrolyte material having a novel composition with the I-4 crystal structure disclosed herein has been developed.

Solid Electrolyte

In an embodiment, a solid electrolyte may include a solid electrolyte material having the composition of Formula 1 described above. The solid electrolyte including the solid electrolyte material may have high ionic conductivity and high chemical stability at the same time, and accordingly, may be suitable for use as an electrolyte in a battery, such as a sodium battery or a lithium battery. Types of lithium batteries including a solid electrolyte may include a lithium battery including a liquid electrolyte, an all-solid-state lithium battery, a lithium air battery, or a capacitor, but the lithium batteries are not limited thereto. Any electrochemical device including a solid electrolyte and capable of being used as an electrochemical device, may be used.

The solid electrolyte may further include, in addition to the solid electrolyte material having the composition of Formula 1 above, a solid electrolyte material in the art. For example, at least one of a sulfide-based conductor and an oxide-based conductor, that are available in the art, may be further used. For example, the additional solid electrolyte may include at least one selected from $Li_3N$, lithium super ionic conductor (LISICON), LIPON ($Li_{3-y}PO_{4-x}N_x$ where 0<y<3 and 0<x<4), thio-LISICON ($Li_{3.25}Ge_{0.25}P_{0.75}S_4$), $Li_2S$, $Li_2S$—$P_2S_5$, $Li_2S$—$SiS_2$, $Li_2S$—$GeS_2$, $Li_2S$—$B_2S_5$, $Li_2S$—$Al_2S_5$, LATP ($Li_2O$—$Al_2O_3$—$TiO_2$_$P_2O_5$), $Li_{(4-x)}Sn_{(1-x)}P_xS_4$ (where 0.655≤x≤0.75), and $Li_{3+3/4x}B_xP_{1-3/4x}S_4$ (where 0.2≤x≤1.0), but the solid electrolyte material is not limited thereto. Any material suitable for used as the solid electrolyte material in the art may be used.

For example, the solid electrolyte may be at least one selected from lithium lanthanum titanate (LLTO, $Li_{0.34}La_{0.51}TiO_{2.94}$), lithium titanium aluminum phosphate (LTAP, $Li_{1+x}Ti_{2-x}Al(PO_4)_3$ where 0≤x≤0.4, in which at least a part of $Ti^{4+}$ and $P^{5+}$ ions is substituted with trivalent cations, such as $Al^{3+}$, $Ga^{3+}$, $Sc^{3+}$, $In^{3+}$, and $Y^{3+}$), and a lithium superIonic conductor (Thio-LISICON, $Li_{4-x}M_{1-y}M'_yS_4$ where M is Si and Ge and M' are P, Al, Zn, or Ga).

The solid electrolyte may be in the form of flowable powder or as a solid form. The solid electrolyte in the solid form may be, for example, a pellet or a thin film, but is not limited thereto. The solid electrolyte may be molded in various forms according to the use.

For example, the solid electrolyte may be in the form of glass-ceramic or ceramic. According to deposition and coating methods, such as a sputtering method and a pulsed laser deposition (PLD) method, the solid electrolyte may be obtained in the form of a thin film.

For example, the solid electrolyte may have a lithium ionic conductivity of greater than or equal to about $1.0 \times 10^{-4}$ S/cm, at room temperature. For example, the solid electrolyte may have a lithium ionic conductivity of greater than or equal to about $1.0 \times 10^{-3}$ S/cm, at room temperature. For example, the solid electrolyte may have a lithium ionic conductivity of greater than or equal to about $1.0 \times 10^{-2}$ S/cm, at room temperature. For example, the solid electrolyte may have a lithium ionic conductivity of greater than or equal to about $1.0 \times 10^{-1}$ S/cm, at room temperature.

Preparation Method of Solid Electrolyte Material

A method of preparing a solid electrolyte material according to an embodiment includes: mixing a compound represented by Formula 3 and amorphous $Li_3PS_4$ to obtain a mixture; and performing a heat treatment on the resulting mixture:

$$L(M1)(M2)(M3)_4. \quad \text{Formula 3}$$

In Formula 3, L may be at least one element selected from a Group 1 element, M1 may be at least one element selected from a Group 2 element, a Group 3 element, a Group 12 element, and a Group 13 element, M2 may be at least one element selected from a Group 5 element, a Group 14 element, and a Group 15 element, and M3 may be at least one element selected from a Group 16 element.

The performing of the heat treatment on the mixture may be at a temperature in a range of about 200° C. to about 300° C., but is not limited thereto. The temperature may be in any range suitable for the preparation of the solid electrolyte material. For example, the heat treatment temperature may be in a range of about 200° C. to about 280° C., specifically about 200° C. to about 250° C., and more specifically about 200° C. to about 230° C.

The compound prepared by the method described above and represented by $L(M1)(M2)(M3)_4$ of Formula 3, may have an I-4 crystal structure. During the mixing of the compound represented by Formula 3 and amorphous $Li_3PS_4$ and the performing of a heat treatment on the resulting mixture, the I-4 crystal structure may be maintained by substituting a portion of M1 with Li. Therefore, the solid electrolyte material prepared according to the method described above may also have an I-4 crystal structure.

Regarding preparation of the compound represented by $L(M1)(M2)(M3)_4$ of Formula 3, the method described above may further include: combining $Li_2S$ as a L precursor, ZnS as a M1 precursor, and $P_2S_5$ as M2 and M3 precursors in a sealed container; mixing the precursors $Li_2S$, ZnS, and $P_2S_5$ to obtain mixed precursors; and performing a heat treatment on the mixed precursors at a first temperature to prepare the compound represented by Formula 3, wherein the performing of the heat treatment on the mixture of the compound represented by Formula 3 and amorphous $Li_3PS_4$ is at a second temperature, and the first temperature may be higher than the second temperature.

The compound represented by $L(M1)(M2)(M3)_4$ of Formula 3 may be prepared by combining $Li_2S$ as a L precursor, ZnS as an M1 precursor, and $P_2S_5$ as M2 and M3 precursors at a molar ratio of 1:2:1, and mixing the precursors.

In addition, amorphous $Li_3PS_4$ to be mixed with the compound represented by $L(M1)(M2)(M3)_4$ of Formula 3 may be prepared by mixing $Li_2S$ and $P_2S_5$ at a molar ratio of 3:1.

Here, the first temperature may be in a range of about 200° C. to about 500° C., but is not limited thereto. For example, the first temperature may be in a range of about 250° C. to 500° C., specifically about 250° C. to 450° C., and more specifically about 270° C. to about 450° C.

The first temperature may be identical to or different from the second temperature.

In an embodiment, the mixing of the compound represented by Formula 3 and amorphous $Li_3PS_4$ may be performed using a dry-mixing process or a wet-mixing process. For example, the mixing of the compound represented by Formula 3 and amorphous $Li_3PS_4$ may be performed using a dry-mixing process.

The mixing of the compound represented by Formula 3 and amorphous $Li_3PS_4$ may be performed using a ball mill or the like. In an embodiment, the mixing of the compound represented by Formula 3 and amorphous $Li_3PS_4$ may be performed using a planetary ball mill at a rotation speed in a range of about 300 rotations per minute (rpm) to about 500 rpm, for a sufficient amount of time.

In an embodiment, the mixing of the compound represented by Formula 3 and amorphous $Li_3PS_4$ may be performed for about 10 to about 40 hours, specifically about 10 to 20 hours, and more specifically about 15 to about 18 hours, but embodiments are not limited thereto.

The mixing of the compound represented by Formula 3 and amorphous $Li_3PS_4$ may be performed by adding the precursors at the same time or in a sequential manner.

The performing of a heat treatment on the resulting mixture may be performed under vacuum at either the first or second temperature, for about at least 10 hours.

In an embodiment, the performing of a heat treatment on the resulting mixture may be performed for about 10 to about 15 hours, specifically about 10 to about 13 hours, and more specifically about 11 to about 13 hours.

When the temperature at which the heat treatment is performed is too low, the resulting product may not have sufficient sintering reactivity. When the temperature at which the heat treatment is performed is too high, the resulting product may undergo phase degradation or Li volatilization. When the time for which the heat treatment is performed is too short, the resulting product may not have sufficient sintering reactivity. When the time for which the heat treatment is performed is too long, the resulting product may undergo Li volatilization.

The solid electrolyte material prepared according to the method described above and represented by Formula 1 may be prepared in various forms, such as powder, a thin film, and a pellet, according to a method, and may be selected differently according to the usage purpose.

All-Solid-State Lithium Battery

In an embodiment, an all-solid-state lithium battery may include a solid electrolyte material having the composition described above.

The all-solid-state lithium battery including the solid electrolyte material having improved ionic conductivity electrolyte may have a reduced interface resistance, thereby reducing polarization. Consequently, the all-solid-state lithium battery may have increased energy efficiency.

The all-solid-state lithium battery may have a structure including a positive electrode, a negative electrode, and a solid electrolyte between the positive electrode and the negative electrode. In addition, the all-solid-state lithium battery may further include polymer electrolyte membranes each between the positive electrode and the solid electrolyte and between the negative electrode and the solid electrolyte. The additional inclusion of the polymer electrolyte membrane may lead to improved adhesion between the solid electrolyte and the positive electrode/negative electrode, and thus, battery characteristics may be improved. The polymer electrolyte membrane may be impregnated in an organic electrolytic solution including a lithium salt and an organic solvent.

The all-solid-state lithium battery may be prepared as follows.

First, a solid electrolyte including the solid electrolyte material described above is prepared.

Next, a positive electrode is prepared.

The positive electrode may be prepared by forming a positive active material layer including a positive active material on a current collector. The positive active material layer may be prepared using a vapor-state method or a solid-state method. Examples of the vapor-state method include pulse laser deposition (PLD), sputtering deposition, and chemical vapor deposition (CVD), but are not limited thereto. Any method suitable for use as a vapor state method may be used. Examples of the solid-state method include a sintering method, a sol-gel method, a doctor-blade method, a screen printing method, a slurry casting method, and a powder compression method, but are not limited thereto. Any method suitable for use as a solid-state method may be used.

The positive active material may be any material suitable for a lithium battery. For example, the positive active material may include at least one selected from a lithium transition metal oxide, a transition metal sulfide, and the like.

For example, the positive active material may include at least one composite oxide of lithium and at least one metal selected from cobalt (Co), manganese (Mn), and nickel (Ni). For example, the positive active material may be a represented by at least one selected from formulae $Li_aA_{1-b}B_bD_2$ (where $0.90 \leq a \leq 1.8$ and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$ and $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be at least one selected from Ni, Co, and Mn; B may be at least one selected from Al, Ni, Co, Mn, chromium (Cr), iron (Fe), Mg, strontium (Sr), vanadium (V), and a rare-earth element; D may be at least one selected from O, fluorine (F), S, and P; E may be at least one selected from Co and Mn; F may be at least one selected from F, S, and P; G may be at least one selected from Al, Cr, Mn, Fe, Mg, lanthanum (La), cerium (Ce), Sr, and V; Q may be at least one selected from titanium (Ti), molybdenum (Mo), and Mn; I may be at least one selected from Cr, V, Fe, Sc, and yttrium (Y); and J may be at least one selected from V, Cr, Mn, Co, Ni, and Cu For example, the positive active material may be at least one selected from $LiCoO_2$, $LiMn_xO_{2x}$ (where x=1, 2), $LiNi_{1-x}Mn_xO_{2x}$ (where $0 < x < 1$), $Ni_{1-x-y}Co_xMn_yO_2$ (where $0 \leq x \leq 0.5$ and $0 \leq y \leq 0.5$), $LiFePO_4$, $TiS_2$, $FeS_2$, $TiS_3$, and $FeS_3$.

The positive active material layer may further include, in addition to the positive active material described above, the solid electrolyte material described above. The additional inclusion of the solid electrolyte material in the positive active material layer may lead to a decrease in an interfacial resistance between the positive active material layer and a layer of the solid electrolyte that contacts the positive electrode, improved ionic conductivity in the positive active material layer, and improved thermal stability of the positive electrode.

In addition, the positive active material layer may further include a conductive material and a binder. Any suitable material available as a conductive material and a binder in the art may be used.

Next, a negative electrode is prepared.

The negative electrode may be prepared in the same manner as in the positive electrode, except that a negative active material is used instead of the positive active material.

The negative electrode may also further include the solid electrolyte material described above as a negative active material layer.

The negative active material may be any material suitable for use in a lithium battery. For example, the negative active material may include at least one selected from lithium metal, a metal that is alloyable with lithium, a transition metal oxide, a non-transition metal oxide, and a carbonaceous material.

Examples of the metal that is alloyable with lithium include at least one selected from Si, Sn, Al, Ge, lead (Pb), bismuth (Bi), antimony (Sb), a Si—Y alloy (where Y is at least one selected from an alkali metal, an alkaline earth-metal, a Group 13 element, a Group 14 element, a transition metal, and a rare-earth element, but not Si), and a Sn—Y alloy (where Y is at least one selected from an alkali metal, an alkaline earth-metal, a Group 13 element, a Group 14 element, a transition metal, and a rare-earth element, other than Sn). Examples of the element Y include at least one selected from Mg, Ca, Sr, barium (Ba), radium (Ra), scandium (Sc), Y, Ti, zirconium (Zr), hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, Ag, gold (Au), Zn, Cd, B, Al, Ga, Sn, In, Ti, Ge, P, As, Sb, Bi, S, Se, tellurium (Te), and polonium (Po).

Examples of the transition metal oxide include at least one selected from lithium titanium oxide, vanadium oxide, and lithium vanadium oxide.

Examples of the non-transition metal oxide include at least one selected from $SnO_2$ and $SiO_x$ (where $0 < x \leq 2$).

Examples of the carbonaceous material include at least one selected from crystalline carbon and amorphous carbon. Examples of the crystalline carbon include at least one selected from natural graphite and artificial graphite, each of which has at least one shape selected from an amorphous shape, a plate shape, a flake shape, a spherical shape, and a fiber shape. Examples of the carbon include at least one selected from soft carbon (low-temperature calcined carbon), hard carbon, mesophase pitch carbide, and calcined coke.

Figure 1:
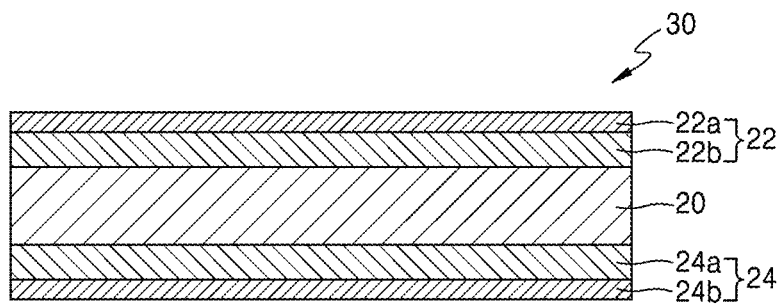
FIG. 1 is a cross-sectional view of an all-solid-state lithium secondary battery, according to an embodiment.

As shown in FIG. 1, an all-solid-state lithium battery 30 includes a solid electrolyte layer 20, a positive electrode 22 on an upper surface of the solid electrolyte layer 20, and a negative electrode 24 on a bottom surface of the solid electrolyte layer 20. The positive electrode 22 includes a positive active material layer 22b that contacts the solid electrolyte layer 20 and a positive current collector 22a that contacts the positive active material layer 22b. The negative electrode 24 includes a negative active material layer 24a that contacts the solid electrolyte layer 20 and a negative current collector 24b that contacts the negative active material layer 24a. The all-solid-state lithium battery 30 may be prepared using at least one of a solid-state method and a vapor-state method. For example, the positive electrode 22 and the negative electrode 24 are formed respectively on opposite sides of the solid electrolyte layer 20 using at least one of a vapor-state method and a solid-state method, and then, the positive current collector 22b and the negative current collector 24b are formed respectively on the positive electrode 22 and the negative electrode 24, thereby completing the preparation of the all-solid-state lithium battery 30. In some embodiments, the negative active material layer 24b, the solid electrolyte layer 20, the positive active material layer 22a, and the positive current collector 22b may be sequentially stacked on the negative current collector 24b using a vapor-state method, a solid-state method, or combinations thereof, thereby completing the preparation of the all-solid-state lithium battery 30.

EXAMPLES

Preparation of Solid Electrolyte Material

Example 1

1) Preparation of LiZnPS$_4$

First, Li$_2$S, P$_2$S$_5$, and ZnS, which were used as starting materials, were weighed and combined at a molar ratio of 1:1:2, and then mixed together. 2 g of the mixture was added to a 45 ml zirconia (ZrO$_2$) container, and zirconia balls were added thereto. The mixture was subjected to a planetary ball milling process for about 16 hours and 40 minutes at a rotation speed of about 400 rpm. The resulting intermediates were sealed within a vacuum-treated quartz tube, and then, subjected to heat treatment at a temperature of about 290° C. for about 12 hours, and a cooling process to room temperature, thereby obtaining the resulting product. Afterwards, X-ray diffraction (XRD) spectroscopy was performed to measure the purity of the resulting product.

Additional products were also prepared in the same manner as in the method described above, except the temperature at which the heat treatment was performed at 380° C. or 450° C. Then, XRD spectroscopy was also performed on these products.

The XRD spectra of the obtained resulting products are shown in FIG. 3. As shown in FIG. 3, peaks of the obtained resulting products were consistent with those of LiZnPS$_4$ having the I-4 crystal structure, and crystal peaks derived from by-products were not observed.

2) Preparation of Amorphous Li$_3$PS$_4$

First, Li$_2$S and P$_2$S$_5$, which were used as starting materials, were weighed and combined at a molar ratio of 3:1, and then mixed together. 20 g of the mixture was added to a 250 ml zirconia (ZrO$_2$) container, and zirconia balls were added thereto. The mixture was subjected to a planetary ball milling process for about 40 hours at a rotation speed of about 300 rpm. Afterwards, XRD spectroscopy was performed on the resulting product, and it was confirmed that the resulting product was amorphous.

3) Preparation of Li$_{2.5}$Zn$_{0.25}$PS$_4$

LiZnPS$_4$ and amorphous Li$_3$PS$_4$ were weighed and combined at a molar ratio of 1:3, and then mixed together. 1.5 g of the mixture was added to a 45 ml zirconia (ZrO$_2$) container, and zirconia balls were added thereto. The mixture was subjected to a planetary ball milling process for about 16 hours and 40 minutes at a rotation speed of about 400 rpm. The resulting intermediates were sealed within a vacuum-treated quartz tube, and then, subjected to a heat treatment at a temperature of about 220° C. for about 12 hours, and a cooling process to room temperature, thereby obtaining a resulting product Li$_{1+2x}$Zn$_{1-x}$PS$_4$ (x=0.75) in the form of powder. That is, Li$_{2.5}$Zn$_{0.25}$PS$_4$ was obtained.

Examples 2 to 9

Solid electrolyte materials each having a composition Li$_{1+2x}$Zn$_{1-x}$PS$_4$, in which x=0.05, 0.125, 0.25, 0.375, 0.5, 0.625, 0.8, 0.9 (Examples 2 to 9, respectively) were prepared in the same manner as in Example 1, except that the mixed ratio of LiZnPS$_4$ and amorphous Li$_3$PS$_4$ was changed.

Comparative Example 1

First, Li$_2$S, P$_2$S$_5$, and ZnS, which are used as starting materials, were weighed and combined at a molar ratio of 5:2:1, and then mixed together. 1.5 g of the mixture was added to a 45 ml zirconia (ZrO$_2$) container, and zirconia balls were added thereto. The mixture was subjected to a planetary ball milling process for about 16 hours and 40 minutes at a rotation speed of about 400 rpm. The resulting intermediates were sealed within a vacuum-treated quartz tube, and then, subjected to a heat treatment at a temperature of about 220° C. for about 12 hours, and a cooling process, thereby obtaining a resulting product Li$_{2.5}$Zn$_{0.25}$PS$_4$ in the form of powder.

Comparative Examples 2 and 3

Samples each having a composition Li$_2$Zn$_{0.5}$PS$_4$ (Comparative Example 2) and a composition Li$_{2.25}$Zn0.375PS$_4$ (Comparative Example 3) were prepared in the same manner as in Example 1, except that the molar ratio of the starting materials Li$_2$S, P$_2$Ss, and ZnS was changed to 2:1:1 (Comparative Example 2) and 7:4:3 (Comparative Example 3).

Comparative Examples 4 and 5

Amorphous Li$_3$PS$_4$ prepared according to Example 1 was sealed within a vacuum-treated quartz tube, and then, subjected to a heat treatment at a temperature of about 250° C. for about 5 hours, thereby preparing a sample. To identify crystallization of the obtained sample, XRD spectroscopy was performed on the resulting sample, and consequently, it was confirmed that the sample had been changed to a crystal called thio-LiSICON-III.

Afterwards, the heat-treated sample and LiZnPS$_4$ were each weighed so that solid electrolyte materials may have a final composition Li$_2$Zn$_{0.5}$PS$_4$ (Comparative Example 4) and a final composition Li$_{2.5}$Zn$_{0.25}$PS$_4$ (Comparative Example 5), and then, mixed together. 1.5 g of the mixture was added to a 45 milliliter (mL) zirconia (ZrO$_2$) container, and zirconia balls were added thereto. The mixture was subjected to a planetary ball milling process for about 16 hours and 40 minutes at a rotation speed of about 400 rpm. The resulting intermediates were sealed within a vacuum-treated quartz tube, and then, subjected to a heat treatment at a temperature of about 230° C. for about 12 hours, and a cooling process to room temperature, thereby obtaining a resulting product in the form of powder.

Determination of Reaction Temperature of LiZnPS$_4$

Figure 2:
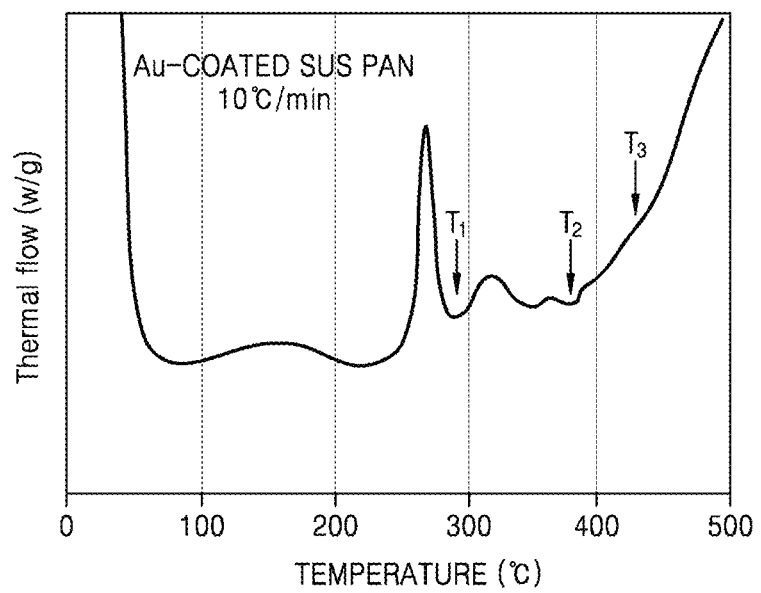
FIG. 2 is a graph of heat flow (watts per gram, W/g) versus temperature (° C.) which shows results of differential scanning calorimetry (DSC) performed on an $LiZnPS_4$ compound.

Li$_2$S, ZnS, and P$_2$S$_5$ precursors at stoichiometric ratios (Li:Zn:P:S=1:1:1:4) were subjected to a planetary ball milling process in the sealed container to avoid air-exposure, thereby preparing LiZnPS$_4$ compound. Then, differential scanning calorimetry (DSC) was performed on the LiZnPS$_4$ to determine synthesis conditions to ensure complete reactions between the precursors. Consequently, as shown in FIG. 2, a strong reaction clearly occurred at a temperature of about 270° C. (T1), followed by two minor reactions at temperatures of 320° C. (T2) and 370° C. (T3). Accordingly, to complete reactions between the precursors, the reaction temperatures were determined to be 290° C., 380° C., and 450° C.

Furthermore, to identify a crystal structure of LiZnPS$_4$, XRD spectroscopy was performed on the LiZnPS$_4$ sample sintered at temperatures of 290° C., 380° C., and 450° C. Consequently, as shown in FIG. 3, it was confirmed that LiZnPS$_4$ had an I-4 crystal structure synthesized with a negligible amount of ZnS impurity.

Figure 4A:
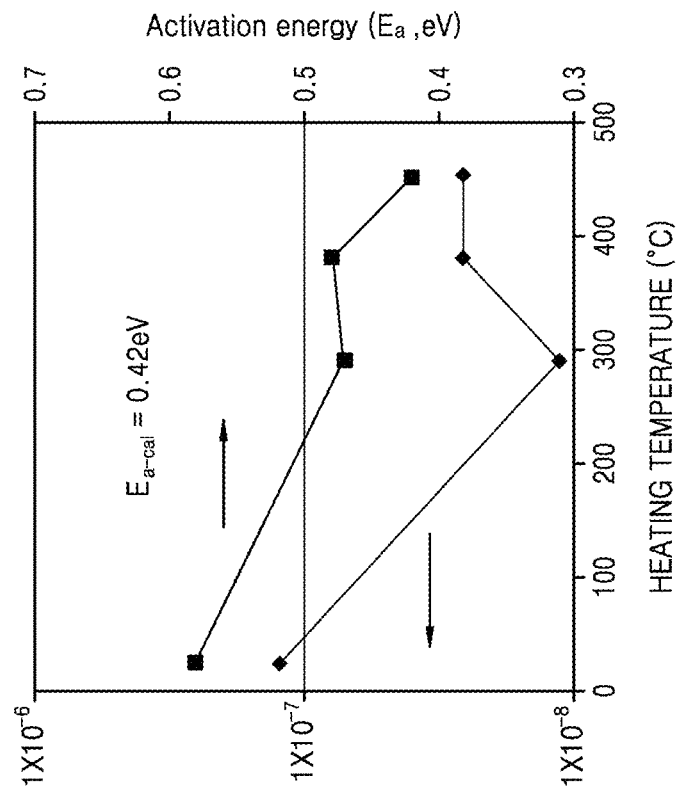
FIG. 4A is cole-cole plot of imaginary impedance (Z", ohm centimeter, Ωcm) versus real impedance (Z', Ωcm) of $LiZnPS_4$ compounds sintered at different temperatures.
Figure 4B:
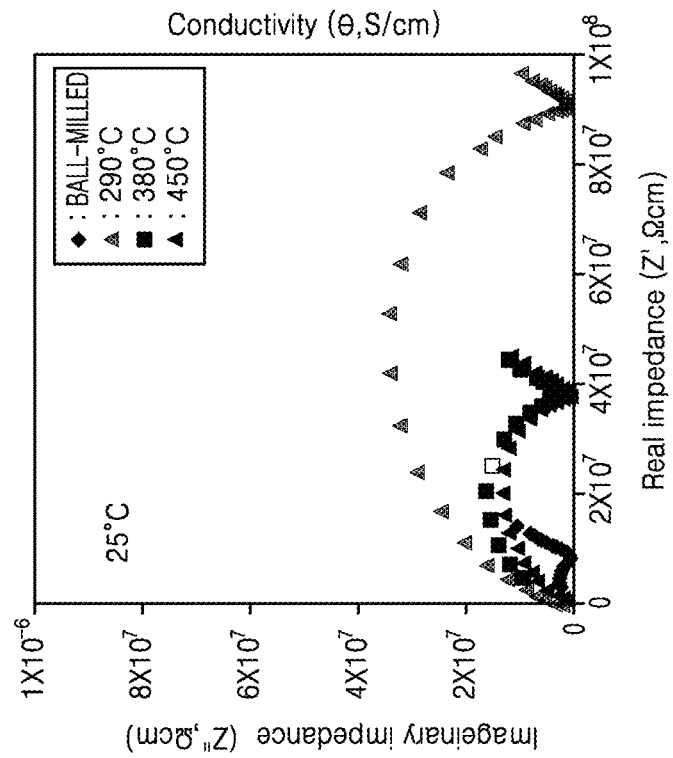
FIG. 4B is a graph of conductivity (σ, siemen per centimeter (S/cm) versus heating temperature (° C.) versus calculated activation energy ($E_a$, electron volts (eV), which shows temperature-dependent activation barrier values of $LiZnPS_4$ compounds sintered at different temperatures.

In addition, the LiZnPS$_4$ sample was pelletized with a pressure of 3 tons per square centimeter (tons/cm$^2$), and indium foils were attached on both sides of the pellet, thereby preparing an experimental sample to measure impedance. Afterwards, impedance of the sample was measured, and consequently, a resistivity of ~9×10$^7$ ohm-centimeters (Ωcm) for LiZnPS$_4$ synthesized at a temperature of 290° C. and a resistivity of ~4×10$^7$ ohm-centimeters (Ωcm) for LiZnPS$_4$ synthesized at temperatures of 380° C. and 450° C. were obtained with respect to the LiZnPS$_4$ sample. In addition, a control sample ball-milled without sintering showed the lowest impedance of ~1×10$^7$ Ωcm, suggesting that crystallization of the stoichiometric LiZnPS$_4$ decreased Li mobility. The obtained activation barrier was about 0.45 eV. Temperature-dependent impedance values and temperature-dependent activation barrier values are shown in FIGS. 4A and 4B.

Evaluation of Solid Electrolyte Material

1) XRD Spectroscopy

The XRD spectroscopy was performed using an X-ray diffractometer using Cu-Kα radiation.

To identify crystallinity of the solid electrolyte materials prepared according to Examples 1 to 8 and Comparative Examples 1 to 5, XRD spectroscopy was performed on each of the solid electrolyte materials prepared according to the Examples and Comparative Examples.

Figure 5:
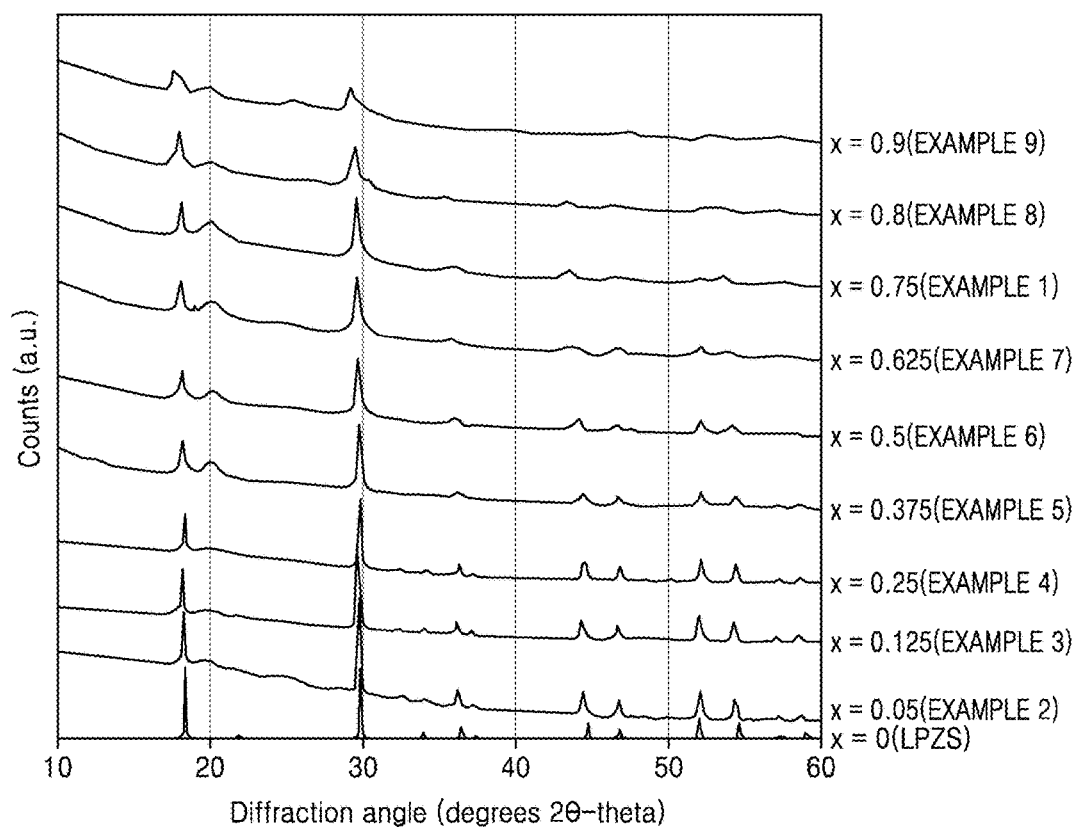
FIG. 5 is a graph of counts (a.u.) versus diffraction angle (degrees 2-theta) which shows XRD patterns of solid electrolyte materials prepared according to Examples 1 to 9.
Figure 6:
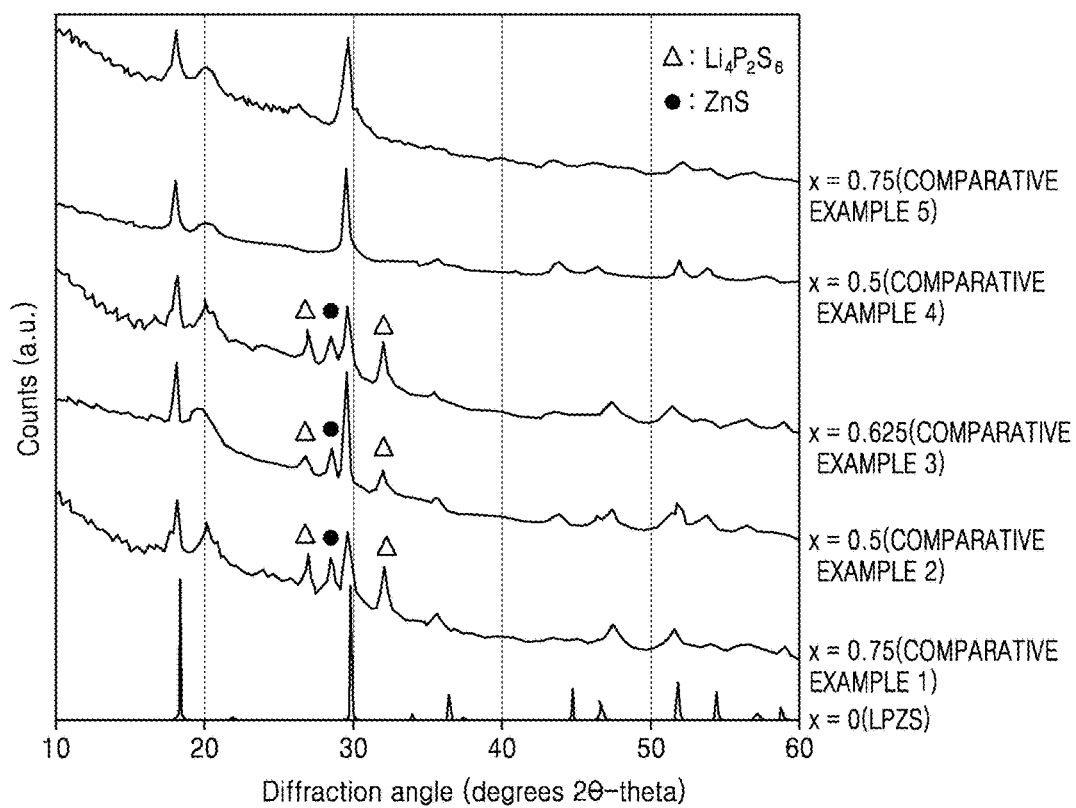
FIG. 6 shows XRD patterns of solid electrolyte materials prepared according to Comparative Examples 1 to 5.

The results of XRD spectroscopy performed on the solid electrolyte materials prepared according to the Examples and Comparative Examples are shown in FIGS. 5 and 6. Referring to FIGS. 5 and 6, the solid electrolyte materials prepared according to Examples 1 to 9 showed XRD peaks similar to those of LiZnPS$_4$ (x=0) having an I-4 crystal structure. That is, it was confirmed that the solid electrolyte materials prepared according to Examples 1 to 9 had I-4 crystal structures. However, the solid electrolyte materials prepared according to Comparative Examples 1 to 3 showed peaks other than XRD peaks of LiZnPS$_4$, suggesting that many impurities were present therein. In addition, it was confirmed that the solid electrolyte materials prepared according to Comparative Examples 4 and 5 had I-4 crystal structures.

2) Raman Spectroscopy

Figure 7:
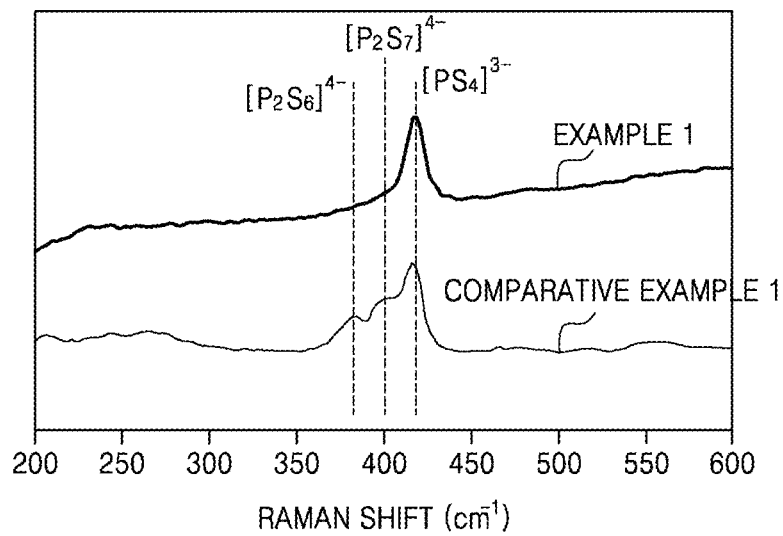
FIG. 7 is a graph of Raman shift (per centimeter, $cm^{-1}$) showing the Raman spectra of solid electrolyte materials prepared according to Example 1 and Comparative Example 1.

To identify a specific structure of each of the solid electrolyte materials prepared according to Example 1 and Comparative Example 1, Raman spectroscopy was performed thereon, and Raman spectra obtained therefrom are shown in FIG. 7.

Referring to FIG. 7, only peaks derived from [PS$_4$]$^{3-}$ ions at about 420 cm$^{-1}$ were observed in the solid electrolyte material prepared according to Example 1, whereas peaks derived from [P$_2$S$_6$]$^{4-}$ and [P$_2$S$_7$]$^{4-}$ ions at about 380 cm$^{-1}$ and about 400 cm$^{-1}$, respectively, were observed in the solid electrolyte material prepared according to Comparative Example 1. Accordingly, it was confirmed that the solid electrolyte material prepared according to Example 1 neither contained impurities, such as [P$_2$S$_6$]$^{4-}$ and [P$_2$S$_7$]$^{4-}$ ions, nor a disulfide bond in the I-4 crystal structure.

3) Impedance Measurement

To measure ionic conductivity of the solid electrolyte materials prepared according to the Examples and Comparative Examples, about 200 miligrams (mg) of each of the solid electrolyte materials was placed in a cylindrical tube having a diameter of about 13 mm, and then, pelletized to a thickness of about 1.0 mm with a pressure of 4 tons. Then, indium gold having a diameter of about 13 mm and a thickness of about 50 μm was compressed on both sides of the pellet by applying a pressure of 1 ton thereto, thereby preparing a sample for measurement. The sample obtained therefrom was then subjected to measurement of ionic conductivity at room temperature according to an alternative current impedance method. The measured impedance values of the solid electrolyte materials prepared according to Examples and Comparative Examples are shown in Table 3. FIG. 8 shows cole-cole plot of the solid electrolyte materials prepared according to Examples 4 to 6 at room temperature.

Referring to Table 3 and FIG. 8, it was confirmed that when the x value was increased from 0.5 (Example 6) to 0.625 (Example 7), the ionic conductivity was accordingly significantly increased.

Each of the precursors was mixed at a molar ratio as shown in Table 3.

TABLE 3

| Precursor | LiZnPS$_4$ | | | Li$_3$PS$_4$ | | Li$_{1+2x}$Zn$_{1-x}$PS$_4$ | | | Conductivity |
|---|---|---|---|---|---|---|---|---|---|
| | Li$_2$S | P$_2$S$_5$ | ZnS | Li$_2$S | P$_2$S$_5$ | LiZnPS$_4$ | Li$_3$PS$_4$ | x value | (S/cm) |
| Control | 1 | 1 | 2 | — | — | — | — | x = 0 | 2.9 × 10$^{-8}$ |
| Example 1 | 1 | 1 | 2 | 3 | 1 | 1 | 3 | x = 0.75 | 5.2 × 10$^{-4}$ |
| Example 2 | 1 | 1 | 2 | 3 | 1 | 19 | 1 | x = 0.05 | <10$^{-8}$ |
| Example 3 | 1 | 1 | 2 | 3 | 1 | 7 | 1 | x = 0.125 | <10$^{-8}$ |
| Example 4 | 1 | 1 | 2 | 3 | 1 | 3 | 1 | x = 0.25 | 1 × 10$^{-7}$ |
| Example 5 | 1 | 1 | 2 | 3 | 1 | 1.67 | 1 | x = 0.375 | 2.1 × 10$^{-5}$ |
| Example 6 | 1 | 1 | 2 | 3 | 1 | 1 | 1 | x = 0.5 | 2.6 × 10$^{-4}$ |
| Example 7 | 1 | 1 | 2 | 3 | 1 | 1 | 1.67 | x = 0.625 | 5.7 × 10$^{-4}$ |
| Example 8 | 1 | 1 | 2 | 3 | 1 | 1 | 4 | x = 0.8 | 4.7 × 10$^{-4}$ |
| Example 9 | 1 | 1 | 2 | 3 | 1 | 1 | 9 | x = 0.9 | 1.5 × 10$^{-4}$ |
| Comparative Example 1 | 5 | 2 | 1 | — | — | — | — | x = 0.75 | 6.5 × 10$^{-5}$ |
| Comparative Example 2 | 2 | 1 | 1 | — | — | — | — | x = 0.5 | 4.3 × 10$^{-5}$ |
| Comparative Example 3 | 7 | 4 | 3 | — | — | — | — | x = 0.625 | 1.3 × 10$^{-5}$ |
| Comparative Example 4 | 1 | 1 | 2 | 3 | 1 | 1 | 1 | x = 0.5 | 2.0 × 10$^{-4}$ |
| Comparative Example 5 | 1 | 1 | 2 | 3 | 1 | 1 | 3 | x = 0.75 | 1.3 × 10$^{-4}$ |

Preparation of all-Solid-State Battery Using Solid Electrolyte Material

Example 10

$LiNi_{0.5}Mn_{0.3}Co_{0.2}O_2$ (NCM) as a positive active material, $Li_4Ti_5O_{12}$ (LTO) as a negative active material, and carbon nanofiber (CNF) as a conductive material were prepared. The solid electrolyte ($Li_{2.25}Zn_{0.375}PS_4$) prepared according to Example 7, a positive or negative active material, and a conductive material (e.g., CNF) were mixed at a weight ratio of about 35:60:5 weight %, thereby preparing positive and negative cladding metals. A positive cladding metal, a solid electrolyte, and a negative cladding metal were stacked at amounts of 20 mg/150 mg/25 mg, and then, compressed by a pressure of about 3 tons/cm², thereby obtaining a test battery.

Comparative Example 6

A test battery was obtained in the same manner as in Example 10, except that amorphous $Li_3PS_4$ was used instead of the solid electrolyte prepared according to Example 7.

Evaluation of all-Solid-State Battery

Each of the test batteries obtained according to Example 10 and Comparative Example 6 was charged with a constant current at a rate of 0.03 C at a temperature of 25° C. until an upper limit voltage reached 2.5 V, subsequently cut-off when a current was 0.03 C while the voltage was maintained at 2.5 V in a constant voltage mode, and discharged with a constant current at a rate of 0.03 C until a lower limit voltage reached 1 V, thereby measuring the initial discharge capacity of the batteries.

The charge/discharge profile for the test batteries are shown in FIG. 9.

As shown in FIG. 9, the test batteries, i.e., the all-solid-state batteries prepared according to Example 10 and Comparative Example 6, respectively had a discharge capacity of about 128 mAh/g-NCM and 123 mAh/g-NCM. That is, it was confirmed that the discharge capacity of the all-solid-state battery prepared according to Example 10 including $Li_{2.25}Zn_{0.375}PS_4$ was increased compared to that of a battery including $Li_3PS_4$ as the solid electrolyte.

In addition, based on the characteristics that are at least equivalent to those of $Li_3PS_4$, $Li_{2.5}Zn_{0.25}PS_4$ was expected to be stable against a reaction voltage of LTO (about 1.5 V vs. Li) and NCM (about 4.0 V vs. Li).

Therefore, it was confirmed that the solid electrolyte as disclosed herein was stable at a voltage in a range of about 1.5 V to about 4.0 V (vs. Li), and that an all-solid-state battery using the solid electrolyte showed excellent characteristics compared to an all-solid-state battery using amorphous $Li_3PS_4$. Without being limited by theory, it is deemed that such better characteristics were a result of the improved conductivity of the solid electrolyte.

As described above, according to one or more embodiments, a solid electrolyte having a specific composition ratio of Li and Zn and an I-4 crystal structure has high ionic conductivity and is stable against lithium metal at the same time.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A solid electrolyte material represented by Formula 1:

$$Li_{1+2x}Zn_{1-x}PS_4 \qquad \text{Formula 1}$$

wherein 0.05≤x<1, wherein the solid electrolyte material has an I-4 crystal structure, and wherein the solid electrolyte material has a peak at about 18° two-theta, when analyzed by X-ray diffraction using CuKα radiation.

2. The solid electrolyte material of claim 1, wherein x of Formula 1 satisfies 0.625≤x≤0.8.

3. The solid electrolyte material of claim 1, wherein the solid electrolyte material does not comprise a disulfide bond.

4. The solid electrolyte material of claim 1, wherein the solid electrolyte material has an ionic conductivity of greater than 2.9×10⁻⁸ Siemen per centimeter as measured at room temperature.

5. A method of preparing a solid electrolyte, the method comprising:

contacting $LiZnPS_4$ and amorphous $Li_3PS_4$ to obtain a mixture; and heat-treating the mixture to obtain the solid electrolyte of claim 1.

6. The method of claim 5, wherein the $LiZnPS_4$ is prepared by:

providing a mixture of $Li_2S$, ZnS, and $P_2S_5$; and heat-treating the mixture to obtain the $LiZnPS_4$.

7. The method of claim 6, wherein $Li_2S$, ZnS, and $P_2S_5$ are contained in the mixture at a molar ratio of 1:2:1.

8. The method of claim 5, wherein the amorphous $Li_3PS_4$ is prepared by mixing $Li_2S$ and $P_2S_5$ at a molar ratio of 3:1.

9. The method of claim 5, wherein the $LiZnPS_4$ and the amorphous $Li_3PS_4$ are contained in the mixture at a molar ratio of 1:3.

10. The method of claim 6, wherein the heat-treating of the mixture of $Li_2S$, ZnS, and $P_2S_5$ comprises heat-treating at a temperature in a range of about 200° C. to about 500° C.

11. The method of claim 5, wherein the heat-treating of the $LiZnPS_4$ and the $Li_3PS_4$ comprises heat-treating at a temperature in a range of about 200° C. to about 230° C.

12. A secondary battery comprising:

a positive electrode comprising a positive active material;

a negative electrode comprising a negative active material; and a solid electrolyte layer between the positive electrode and the negative electrode, the solid electrolyte layer comprising the solid electrolyte material of claim 1.

13. The solid electrolyte material of claim 1, wherein the solid electrolyte material has peaks at about 29.5° two-theta, about 34° two-theta, about 35.5° two-theta, about 43.5° two-theta, about 46.5° two-theta, about 52° two-theta, and about 54° two-theta, when analyzed by X-ray diffraction using CuKα radiation.

14. The solid electrolyte material of claim 1, wherein x of Formula 1 satisfies 0.25≤x<1.

15. The solid electrolyte material of claim 1, wherein a structure of the solid electrolyte material comprises a body centered cubic anion sublattice.

16. The solid electrolyte material of claim 15, wherein the structure of the solid electrolyte material comprises adjacent tetrahedral lithium sites.

17. The solid electrolyte material of claim 1, wherein $[P_2S_6]^{4-}$ and $(P_2S_7)^{4-}$ are absent based on Raman analysis for peaks at 380 inverse centimeters and 400 inverse centimeters, respectively.

18. The solid electrolyte material of claim 1, wherein the solid electrolyte material has a peak at position of about 17.8° two-theta to about 18.4° two-theta, when analyzed by X-ray diffraction using CuKα radiation.

19. The solid electrolyte material of claim 1, wherein the solid electrolyte material has peaks at about 29.4° two-theta to about 29.8° two-theta, about 33.9° two-theta to about 34.2° two-theta, about 35.4° two-theta to about 36.3° two-theta, about 43.2° two-theta to about 44.4° two-theta, about 46.3° two-theta to about 46.8° two-theta, about 51.9° two-theta to about 52.10 two-theta, and about 53.3° two-theta to about 54.4° two-theta, when analyzed by X-ray diffraction using CuKα radiation.

20. A solid electrolyte material represented by Formula 1:

$$Li_{1+2x}Zn_{1-x}PS_4 \quad \text{Formula 1}$$

wherein 0.05≤x<1, and wherein $[PS_4]^{3-}$ anions of the solid electrolyte define a body centered cubic sublattice.

21. The solid electrolyte material of claim 20 wherein x of Formula 1 satisfies 0.25≤x<1.

22. The solid electrolyte material of claim 20, wherein the solid electrolyte material has peak at about 18° two-theta, when analyzed by X-ray diffraction using CuKα radiation.

23. The solid electrolyte material of claim 22, wherein a structure of the solid electrolyte comprises adjacent tetrahedral lithium sites.

24. A solid electrolyte material prepared by:
contacting $Li_2S$, $ZnS$, and $P_2S_5$ to obtain $LiZnPS_4$; and
combining the $LiZnPS_4$ and amorphous $Li_3PS_4$ to form the solid electrolyte material,
wherein the solid electrolyte material has an I-4 crystal structure,
wherein the solid electrolyte material has an ionic conductivity of greater than $2×10^{-4}$ Siemen per centimeter, and
wherein the solid electrolyte material has a peak at position of about 18°±0.50 two-theta, when analyzed by X-ray diffraction using CuKα radiation.

* * * * *